United States Patent
Chen et al.

(10) Patent No.: US 9,202,188 B2
(45) Date of Patent: Dec. 1, 2015

(54) IMPACT ANALYSIS OF CHANGE REQUESTS OF INFORMATION TECHNOLOGY SYSTEMS

(71) Applicant: International Business Machines Corporation, Armonk, NY (US)

(72) Inventors: Hao Chen, Beijing (CN); Claudio Cozzi, Foster City, CA (US); Ya Bin Dang, Beijing (CN); Howard M. Hess, Winnetka, IL (US); Steven M. Kagan, Burr Ridge, IL (US); Feng Li, Beijing (CN); Shao Chun Li, Beijing (CN); Jeffrey L. Robinson, Dearborn, MI (US); Xin Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/455,983

(22) Filed: Aug. 11, 2014

(65) Prior Publication Data
US 2015/0067635 A1    Mar. 5, 2015

(30) Foreign Application Priority Data
Aug. 30, 2013  (CN) .......................... 2013 1 0386713
Aug. 30, 2013  (CN) .......................... 2013 1 0389314

(51) Int. Cl.
G06F 9/44    (2006.01)
G06Q 10/06   (2012.01)

(52) U.S. Cl.
CPC ..................................... *G06Q 10/06* (2013.01)

(58) Field of Classification Search
CPC .............. G06Q 10/06; G06F 8/20; G06F 8/71
USPC .................................................. 716/101, 102
See application file for complete search history.

(56) References Cited

U.S. PATENT DOCUMENTS 7,103,871 B1   9/2006  Kirkpatrick et al.
7,313,531 B2  12/2007  Chappel et al.
(Continued)

FOREIGN PATENT DOCUMENTS

EP       2199901 A1    6/2010
KR     101176647 B1    8/2012
WO    2011031328 A2    3/2011

OTHER PUBLICATIONS

Boehm, "Software Engineering Economics", 2002, ACM Digital Library, Abstract, pp. 641-686, http://dl.acm.org/citation.cfm?id=944370, Accessed on Jul. 24, 2014.
(Continued)

*Primary Examiner* — Anna Deng
(74) *Attorney, Agent, or Firm* — Vazken Alexanian; Arnold B. Bangali

(57) ABSTRACT

A method for impact analysis of change requests of a computing system is provided. The method includes, identifying artifacts and tasks that are impacted by a change request on a target project based on a change request repository, an artifact dependency network and a task-artifact mapping repository. The method further includes, determining an impact analysis priority for each of the identified tasks based on associations among the change request and the identified artifacts and tasks, and a project status tracking repository. The method further includes analyzing an impact of the change request on each of the identified tasks according to the determined impact analysis priority. The method further includes obtaining requirements, requirement dependencies and requirement constraints of the project scope to identifying artifacts and tasks that are impacted by a change request on the target project of the project scope.

20 Claims, 21 Drawing Sheets

(56) References Cited

U.S. PATENT DOCUMENTS

| | | | |
|---|---|---|---|
| 7,484,212 | B2 | 1/2009 | Hellerstein et al. |
| 8,005,706 | B1 | 8/2011 | Cassone et al. |
| 8,006,222 | B2 | 8/2011 | Ruhe |
| 8,191,044 | B1 | 5/2012 | Berlik et al. |
| 8,209,211 | B2 | 6/2012 | Engle et al. |
| 8,306,841 | B2 | 11/2012 | Clarke |
| 8,352,914 | B2 | 1/2013 | Sarkar et al. |
| 2004/0107125 | A1* | 6/2004 | Guheen et al. ............. 705/7 |
| 2005/0132306 | A1* | 6/2005 | Smith et al. ............. 716/1 |
| 2007/0143744 | A1* | 6/2007 | Clemm et al. ............. 717/128 |
| 2008/0270210 | A1 | 10/2008 | Kratschmer et al. |
| 2009/0327000 | A1 | 12/2009 | Davis et al. |
| 2011/0119194 | A1 | 5/2011 | McLees et al. |
| 2011/0125553 | A1 | 5/2011 | Mazzoleni et al. |

OTHER PUBLICATIONS

Jones, "Software Project Management Practices: Failure Versus Success©", Oct. 2004, Project Management, pp. 5-9.
"SP43-1—Project Change Management", CII Publications and Events Center, https://www.construction-institute.org/scriptcontent/more/sp43_1_more.cfm, Accessed on Jul. 24, 2014.
Boehm, "Software Cost Estimation with Cocomo II with Cdrom", 2000, ACM Digital Library, Abstract, http://dl.acm.org/citation.cfm?id=557000, Accessed on Jul. 24, 2014.
Ibbs, "Quantitative Impacts of Project Change: Size Issues", Journal of Construction Engineering and Management, Sep. 1997, pp. 308-311.
Ibbs et al., "Fast-Tracking's Impact on Project Change", Dec. 1998, Project Management Institute, vol. 29, No. 4, pp. 35-41, Project Management Journal.
Cooper Associates, "Project Change Impact Assessment and Mitigation", 2009, www.kcooperassociates.com.
Ochoa et al., "Estimating Software Projects Based on Negotiation", Journal of Universal Computer Science, vol. 15, No. 9, 2009, pp. 1812-1832.
Lindvall et al., "Traceability aspects of impact analysis in object-oriented systems", Journal of Software Maintenance: Research and Practice, vol. 10, Issue 1, Jan./Feb. 1998, pp. 37-57, Abstract, Accessed on Jul. 22, 2014.
Lee et al., "Change Impact Analysis with a Goal-Driven Traceability-Based Approach", International Journal of Intelligent Systems, vol. 25, pp. 878-908, 2010.
Ye et al., "Reuse-Conducive Development Environments", Submission to ASE Journal (revision), Abstract, vol. 12, Issue 2, Apr. 2005, pp. 199-235.
Arnold, "Software Change Impact Analysis", 1996, http://dl.acm.org/citation.cfm?id=525066&coll=DL&dl=Guide&CFID..., ACM Digital Library, Abstract, Accessed on Jul. 22, 2014.
Loyall et al., "Impact Analysis and Change Management for Avionics Software", 1997, IEEE, pp. 740-747.
Law et al., "Whole Program Path-Based Dynamic Impact Analysis", Proceedings of the 25th International Conference on Software Engineering, 2003, pp. 308-318.
Apiwattanapong et al., "Efficient and Precise Dynamic Impact Analysis Using Execute-After Sequences", ICSE May 15-21, 2005, pp. 432-441.
Ceccarelli et al., "An Eclectic Approach for Change Impact Analysis", ICSE, May 2-8, 2010, pp. 163-166.
Li et al., "A Business Process-Driven Approach for Requirements Dependency Analysis", BPM 2012, LNCS 7481, pp. 200-215, 2012.
Li et al., "A survey of code-based change impact analysis techniques", Software Testing, Verification and Reliability, 2012, Published online in Wiley Online Library (wileyonlinelibrary.com).
O'Neal, "Analyzing the Impact of Changing Software Requirements: A Traceability-Based Methodology", A Dissertation, Submitted to the Graduate Faculty of the Louisiana State University and Agricultural and Mechanical College in partial fulfillment of the requirements for the degree of Doctor of Philosophy in The Department of Computer Science, Dec. 2003.
Pending CN Application 201310389314.0, entitled: "Method and Apparatus for Impact Analysis of Change Requests", filed on Aug. 30, 2013.
Chen et al., "A Dynamic Intelligent Decision Approach to Dependency Modeling of Project Tasks in Complex Engineering System Optimization", Mathematical Problems in Engineering, Hindawi Publishing Corporation, vol. 2013, Article ID 398123, pp. 1-12.
Pending CN Application 201310386713.1, entitled: "Method and Apparatus for Assisting the Determination of Project Scope", filed on Aug. 30, 2013.
Subha et al., "Conceptual Dependency Based Requirements Clustering for Component Selection" International Journal of Advanced Research in Computer Engineering & Technology, (IJARCET), vol. 2, Issue 4, Apr. 2013, pp. 1518-1522.
Kama et al., "Extending Change Impact Analysis Approach for Change Effort Estimation in the Software Development Phase", Recent Advances in Applied Computer Science and Digital Services, pp. 27-33, 2013.
"Introduction to Function Point Analysis", Fundamentals & Introduction of Function Point Analysis, http://www.softwaremetrics.com/fpafund.htm, pp. 1-6, Accessed on Jun. 5, 2014.
IBM, "IBM Rational Change Integrate development, IT and enterprise change management for long-term business value", IBM Software, Change and configuration management, Nov. 2011, pp. 1-4.
Holmes et al., "Approximate Structural Context Matching: An Approach to Recommend Relevant Examples", IEEE Transactions on Software Engineering, vol. 32, No. 12, Dec. 2006, pp. 952-970.
Rajagopalan, "Software Tool for Analyzing Changes", Jun. 4, 2008, ip.com, IPCOM000171321D, pp. 1-8.
Narayan, "Scope Change Management: Keeping Projects on Track", IT Management—Scope Change Management, http://www.technologyexecutivesclub.com/Articles/management/artScopeChangeManagem..., Accessed on Jun. 5, 2014, pp. 1-2.
Kersten et al., "Using Task Context to Improve Programmer Productivity", SIGSOFT'06/FSE-14, Nov. 5-11, 2006, pp. 1-11.
Lehnert, A Taxonomy for Software Change Impact Analysis, Department of Software Systems / Process Informatics, IWPSE-EVOL 2011, Sep. 5-6, Copyright 2011 ACM, pp. 41-50.
Linstone et al., "The Delphi Method Techniques and Applications", 2002, pp. 1-618.
Missouri Project Management Best Practices, Release 4.1, "Chapter 3: Project Management Planning", Jul. 14, 2007, pp. 1-69.
Meli, "Measuring Change Requests to support effective project management practices", Proc of the ESCOM 2001, London, Apr. 2001, pp. 25-34.
Anda et al., "Estimating Software Development Effort based on Use Cases—Experiences from Industry", Proceedings of the 4th International Conference on the Modeling language, Modeling Languages, Concepts and Tools, 2001, pp. 487-502.

* cited by examiner

| Candidate Grouping Scheme | No. of Groups | Workload | | | Value | | | Deadline | | |
|---|---|---|---|---|---|---|---|---|---|---|
| | | G1 | G2 | G3 | G1 | G2 | G3 | G1 | G2 | G3 |
| S1 | 3 | 250 | 300 | 1190 | 24 | 29 | 100 | 09-13 | 09-13 | 12-13 |
| S2 | 2 | 950 | 790 | | 73 | 80 | | 09-13 | 12-13 | |
| S3 | 3 | 30 | 520 | 1190 | 3 | 50 | 100 | 09-13 | 09-13 | 12-13 |

FIG. 6

| Batch | Thread | Collaboration Topic | Attendee | Collaboration Context |
|---|---|---|---|---|
| 1 | 1.1 | CR2, CR1, CR5 -> CR3 | Initiator: BA3 for CR3<br>Attendee (M): BA1 for CR1, BA2 for CR2 and BA5 for CR5<br>Attendee (O): BA4 for CR4 | |
| 2 | 2.1 | CR1 <-> CR2 | Initiator: BA1 for CR1 or BA2 for CR2<br>Attendee (M): BA1 for CR1 and BA2 for CR2 | |
| | 2.2 | CR4 -> CR5 | Initiator: BA5 for CR5<br>Attendee (M): BA4 for CR4 | |

FIG. 25

IMPACT ANALYSIS OF CHANGE REQUESTS OF INFORMATION TECHNOLOGY SYSTEMS

CROSS REFERENCE

The present application claims the benefit of priority of Chinese Patent Application Serial Number 201310389314.0, titled "Method and Apparatus for Impact Analysis of Change Requests" filed Aug. 30, 2013 with the State Intellectual Property Office (SIPO) of the People's Republic of China, the contents of which are herein incorporated by reference in its entirety. The present application also claims the benefit of Chinese Patent Application Serial Number 201310386713.1, titled "Method and Apparatus for Assisting the Determination of Project Scope" filed Aug. 30, 2013 with the State Intellectual Property Office (SIPO) of the People's Republic of China, the contents of which are also herein incorporated by reference in its entirety.

BACKGROUND

The present invention relates to the information technology, and more particularly, to computer implemented tools for assisting the determination of project scope and impact analysis of change request of the project scope.

Businesses of modern enterprises get support of many interdependent software applications. There are continuous requirements for making changes to existing applications. The requirements arise from many sides: business innovation, technological innovation, defect fixing and so on. There are often complex interdependences among various requirements for changes. On the one hand, there might be existed direct dependency between certain two requirements; on the other hand, there may be indirect dependency among requirements of different applications due to the presence of interdependences of the applications. For enterprises owning a number of applications, there are often a large number of (e.g., thousands of) such requirements for changes. It is an onerous and difficult work to determine projects to be carried out for the requirements and optimize the scope of the projects. This is because, in defining project scope, the dependency of requirements shall be considered and constraints on the requirements shall be met as well. In addition, different experts and project management professionals may have different knowledge, experiences and habits. So, artificial determination of project scope often leads to conflicts in prioritization, requirement constraints, requirement relationships and so on.

Also, modern enterprises are usually supported by several IT systems, such as an HR management system, a mail system, a business operation system, etc. The several IT systems are supported by a number of inter-dependent applications. For the purposes of business innovation, technical renovation, defect fixing and so on, it is necessary to run hundreds of projects based on a number of inter-dependent applications. Since a number of applications are inter-dependent on each other, a plurality of projects that are running based on these applications are also related to each other. Thus, changes which are implemented in some project(s) might exert an impact on related project(s) or impact of the project scope. However, sometimes impacts of change implemented in a target project on related project(s) cannot be detected in time, so that the related project(s) cannot be delivered as scheduled.

Usually, a project manager will carefully analyze the impact of a change request on a target project before assigning the change request to the target project, but cannot accurately analyze and evaluate impacts of change of the target project on related project(s) due to complex relations among these projects. Therefore, it becomes a burning problem that how to analyze and evaluate the possible impact of a change request on a target project on project(s) which are related to the target project before accepting the change request of the project scope.

SUMMARY

Therefore, embodiments of the present invention provide a method, computer system and a computer program product for impact analysis of change requests, so as to solve or at least partially alleviate the above-mentioned problems in the prior art.

In one aspect, it is provided a method for assisting the determination of project scope comprising: obtaining requirements, requirement dependencies and requirement constraints; generating a first grouping scheme according to the requirement dependencies, wherein the requirements are divided into one or more groups such that requirements having a dependency relationship are included into same group; receiving user-defined relationship constraints; generating a set of candidate grouping schemes that satisfy the user-defined relationship constraints based on the first grouping scheme, wherein each candidate grouping scheme in the generated set comprises one or more groups; calculating a combined indicator for each candidate grouping scheme in the generated set according to the requirement constraints; and displaying each candidate grouping scheme in the generated set and its corresponding combined indicator.

The method further includes determination of impact analysis of change requests of the project scope. The method comprises identifying artifacts and tasks that are impacted by a change request on a target project based on a change request repository, an artifact dependency network and a task-artifact mapping repository. The method further comprises, determining an impact analysis priority for each of the identified tasks based on associations among the change request and the identified artifacts and tasks, and a project status tracking repository. The method further comprises, analyzing an impact of the change request on each of the identified tasks according to the determined impact analysis priority.

In another aspect, it is provided an apparatus for assisting the determination of project scope, comprising: a data acquisition and analysis module configured to obtain requirements, requirement dependencies and requirement constraints; an initial grouping module configured to generate a first grouping scheme according to the requirement dependencies, wherein the requirements are divided into one or more groups such that requirements having a dependency are included into a same group; a relationship constraint receiving module configured to receive user-defined relationship constraints; an updating module configured to generate a set of candidate grouping schemes that satisfy the user-defined relationship constraints based on the first grouping scheme, wherein each candidate grouping scheme in the generated set comprises one or more groups; a combined indicator calculating module configured to calculate a combined indicator for each candidate grouping scheme in the generated set according to the requirement constraints; and a displaying module configured to display each candidate grouping scheme in the generated set and its corresponding combined indicator. By using the systematic assisting tools of the invention, project managers in software development can improve their efficiency of and reduce work load in the determination and optimization of project scope.

In yet another embodiment, there is provided, a computer system for impact analysis of change requests of a project scope. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions to identify artifacts and tasks that are impacted by a change request on a target project based on a change request repository, an artifact dependency network and a task-artifact mapping repository. The computer system further comprises program instructions to determine an impact analysis priority for each of the identified tasks based on associations among the change request and the identified artifacts and tasks, and a project status tracking repository. The computer system further comprises program instructions to analyze an impact of the change request on each of the identified tasks according to the determined impact analysis priority.

In yet another embodiment, a computer program product for impact analysis of change requests of a project scope. The computer program product comprises one or more processors, one or more computer-readable memories, one or more computer-readable tangible storage devices and program instructions which are stored on at least one of the one or more storage devices for execution by at least one of the one or more processors via at least one of the one or more memories. The computer program product further comprises program instructions to identify artifacts and tasks that are impacted by a change request on a target project based on a change request repository, an artifact dependency network and a task-artifact mapping repository. The computer program product further comprises program instructions to determine an impact analysis priority for each of the identified tasks based on associations among the change request and the identified artifacts and tasks, and a project status tracking repository. The computer program product further comprises program instructions to analyze an impact of the change request on each of the identified tasks according to the determined impact analysis priority.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 6 illustratively depicts a table showing combined indicators, calculated according to an embodiment of the invention, of individual candidate grouping schemes of the generated set of candidate grouping schemes shown in FIG. 5.

FIG. 25 illustrates collaboration contexts defined according to an embodiment of the present invention.

DETAILED DESCRIPTION

Figure 1:
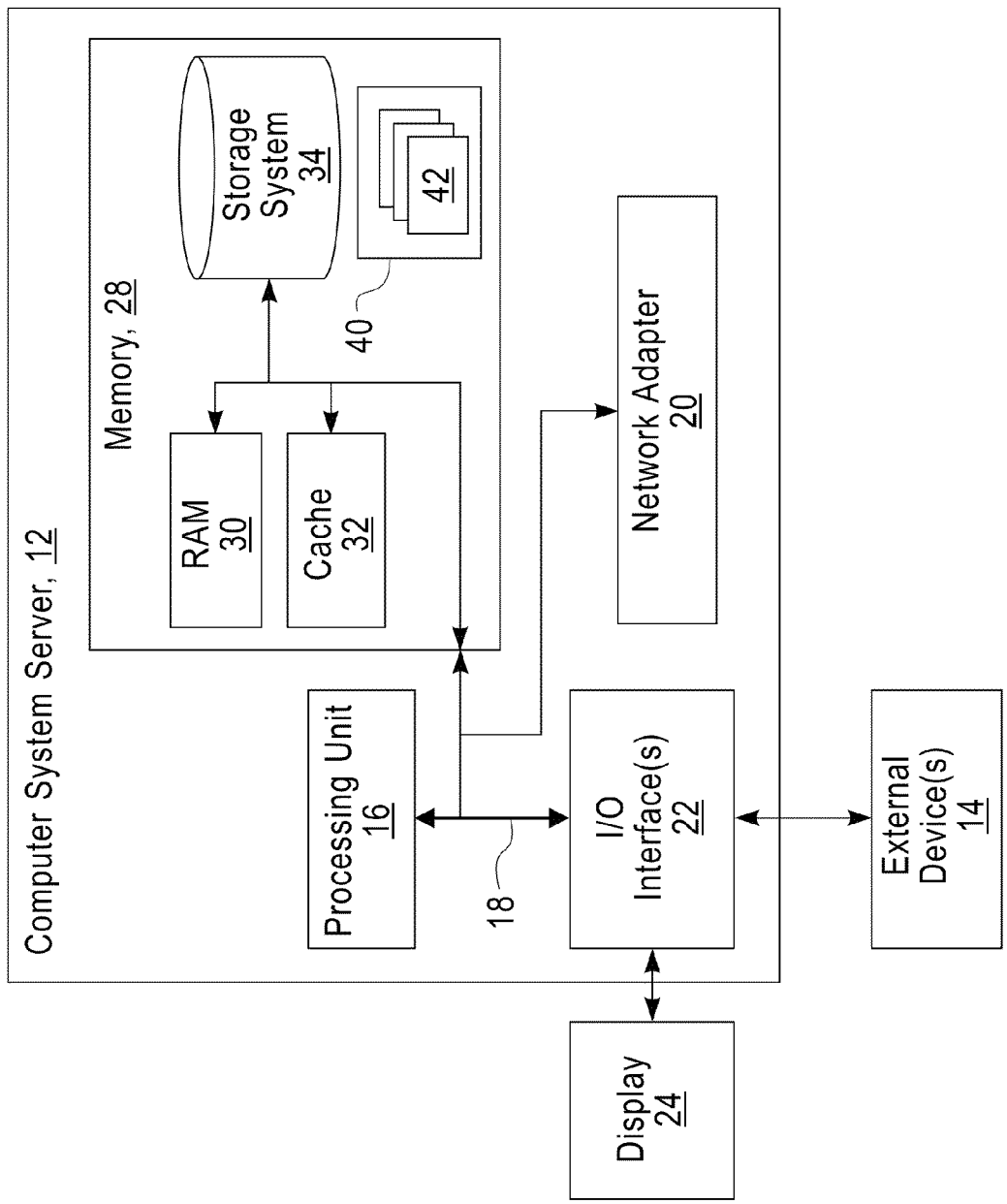
FIG. 1 illustrates a block diagram of an exemplary computer system which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
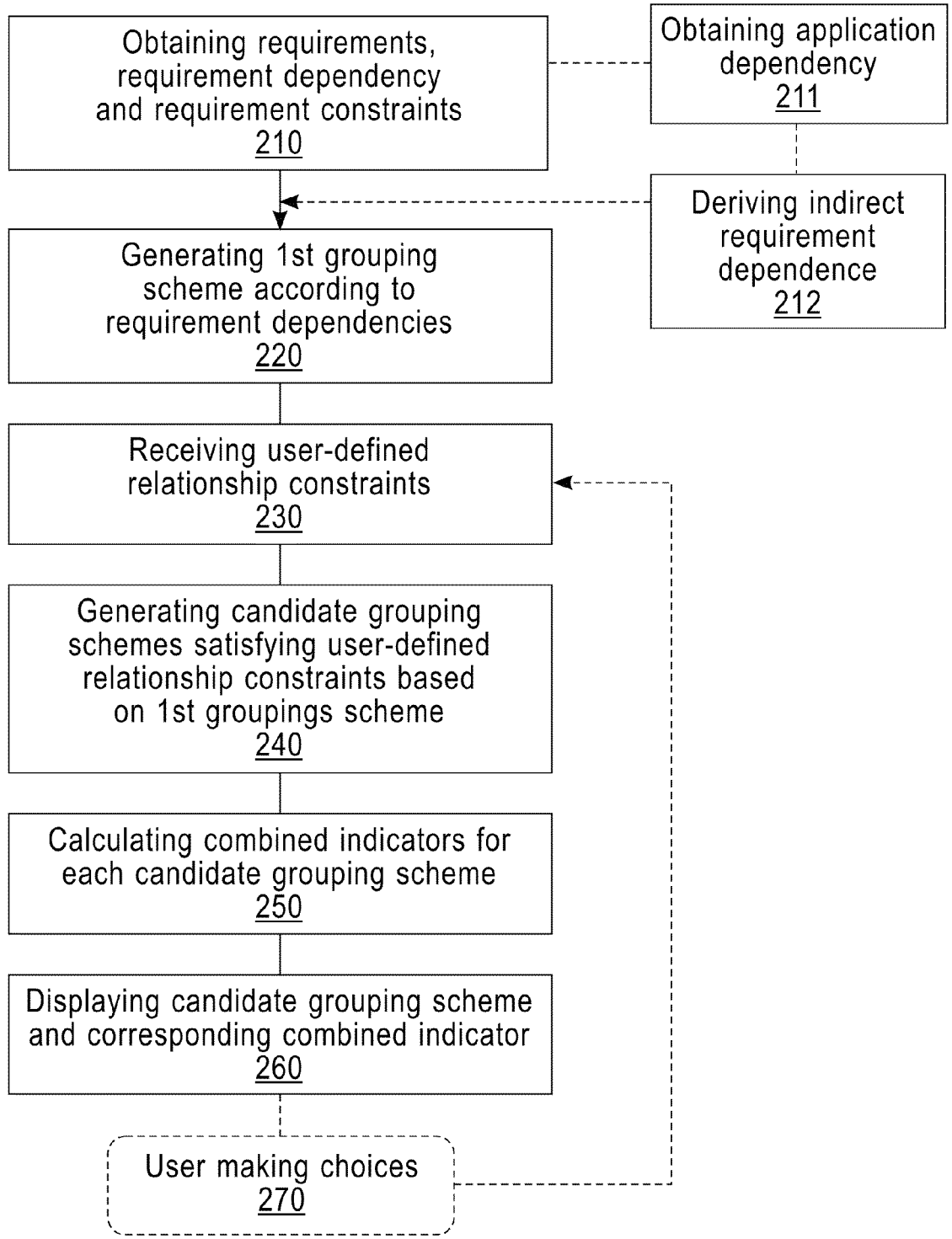
FIG. 2 is a flowchart of a method for assisting the determination of project scope according to an embodiment of the invention.

Embodiments of the present invention will be described below. Refer first to FIG. 2, in which a flowchart of a method for assisting the determination of project scope according to an embodiment of the invention is shown. The method process shown in FIG. 2 begins at Step 210. In Step 210, requirements, requirement dependencies and requirement constraints are obtained. In the context of the invention, the term "requirement" may also refer to a change request, for example, a change request to an IT application (hereinafter referred to as "application"). There is often direct dependency, or direct requirement dependency, between one requirement and another. For example, requirement 1 is "to modify a database table in a DB-2 database" and requirement 3 is "to produce a data report according to the DB-2 database". In this case, there is direct dependency between requirement 1 and requirement 3, wherein requirement 3 is dependent on requirement 1 because database tables should be modified first before the report can be produced on the basis of modified database tables. In addition, there may be indirect dependency between one requirement and another. For example, if requirement 1 aims at application 1 and requirement 2 aims at application 2, and there is dependency between application 1 and application 2, then there will be dependency between requirement 1 and requirement 2 because of their respective relationship with application 1 and application 2. This kind of dependency is said to be indirect requirement dependency or simply indirect dependency.

Two requirements are said to have a dependency if there is direct dependency and/or indirect dependency between them. In project management, of the properties used for describing requirements, there is a class of properties for defining the constraints on requirements, such as workload constraint, deadline constraint, value constraint and so on. For example, for a certain requirement, workload constraint is 30 (in person•day), deadline constraint is September 13, and value constraint is $10,000 and so on. In the present specification, this type of constraint is referred to as "requirement constraint" or simply "constraint" where the context is clear. In the practice of project management, requirements are usually pre-processed so that requirement description and associated data will be generated in predetermined forms and stored into a requirements repository (not shown). In Step 210, the requirements, requirement dependencies and requirement constraints may be obtained from such a requirements repository.

To facilitate the following description, it is assumed that nine requirements (requirement 1, requirement 2, . . . , requirement 9) are obtained in Step 210, denoted as R={r1, r2, . . . r9} in which the uppercase character R represents the set of requirements and the lowercase character r represents a requirement, for example, r1 represents requirement 1. In addition, it is assumed that dependency relationships of the nine requirements—e.g., "r3 depends on r1"—and the requirement constraint for each of the requirements—e.g., "the amount of work required for r1 is 30 person•days"—are also obtained in Step 210. Then, the process proceeds to Step 220.

Figure 3:
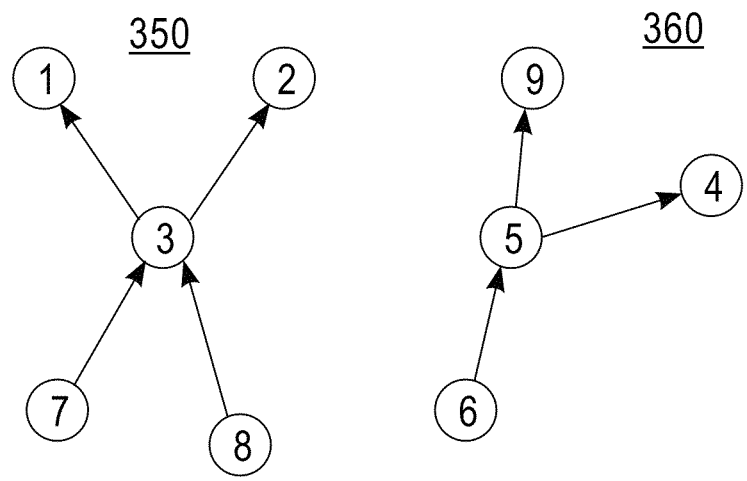
FIG. 3 illustratively depicts a first grouping scheme generated according to an embodiment of the invention.

In Step 220, a first grouping scheme is generated according to the requirement dependencies, wherein the requirements are divided into one or more groups such that requirements having a dependency are included into a same group. Step 220 is also referred to as "initial grouping step". FIG. 3 illustratively depicts a first grouping scheme generated according to an embodiment of the invention, in which two connected graphs 350 and 360 are shown to represent a first grouping scheme resulted from Step 220. In the connected graphs, a node represents a requirement and a directed edge between two nodes represents requirement dependency, or dependency of two requirements. For example, in connected graph 350, node 1 represents r1, and the directed edge from node 3 to node 1 indicates that r3 is dependent on r1. FIG. 3 shows that, according to the first grouping scheme generated at Step 220 in the example, nine requirements r1, . . . , r9 are divided into two groups: a first group including five requirements and denoted as G350={r1, r2, r3, r7, r8} wherein "G350" denotes the group represented by connected graph 350; and a second group including four requirements and denoted as G360={r4, r5, r6, r9} wherein "G360" denotes the group represented by connected graph 302. FIG. 3 also shows dependency of other requirements, namely, r3 depends on r2, r5 depends on r4 and r9, r6 depends on r6, and both r7 and r8 are dependent on r3. All of these dependencies are already acquired at Step 210. As shown in FIG. 3, requirements having a dependency are divided into the same group.

It is to be noted that, in FIG. 3, connected graphs are used to represent individual groups in the first grouping scheme. However, it is merely an example for illustration. As will be appreciated by one skilled in the art, other forms (e.g., link table) that are suitable for processing by the computer may also be taken to represent individual groups and their associated data in the first grouping scheme. According to an embodiment of the invention, the requirement dependencies comprise direct requirement dependencies. As mentioned above, direct requirement dependencies may be obtained from the requirements repository. According to an embodiment of the invention, the requirements are requests for change that aim at different existing applications and the requirement dependencies comprise indirect requirement dependencies, as shown in the figure. In this case, the method may further comprise:

Step 211, obtaining the dependency relationship of the applications aimed at by the requirements; and Step 212, deriving the indirect dependency of any two of the requirements according to the dependency relationship of the applications aimed at by the requirements. For example, requirement 1 is aiming at application 1 and requirement 2 is aiming at application 2. In this case, the requirement dependencies based on which the first grouping scheme is generated at Step 220 may comprise not only at least one direct dependency, but also at least one indirect dependency. In practical implementations, Step 211 and Step 212 may be integrated with Step 210 into a single step, or performed after Step 210. In the practice of project management, the information on application description and description of application relationship in a predetermined format is usually saved into an applications repository (not shown). Thus the application and the description of application relationship, such as the relationship between application 1 and application 2, may be obtained from the applications repository. If there is a dependency relationship between application 1 and application 2, then it may be assumed that there is indirect dependency between requirement 1 and requirement 2. For example, if application 1 depends on application 2, then it may be derived that requirement 1 depends on requirement 2. In Step 230, user-defined relationship constraints are received. According to an embodiment of the invention, the relationship constraints comprise at least one of: 1. an inclusive constraint; and 2. an exclusive constraint.

An inclusive constraint is a request that a certain requirement shall be included into the same group as another requirement. For example, "if r1 and r2 are in a same group, then r6 should be included into the same group"; "r1 and r6 should be included into the same group", and so on. In practical implementations of determining project scope, inclusive constraint "r1 and r6 must be included into the same group" could mean that the user wants to include the requirement r1 and r6 into a same project. An exclusive constraint is a request that a certain requirement shall not be included into the same group as another requirement and/or a certain requirement shall not be included into particular one or more groups. For example, "if r2 and r3 is in a group, then r5 should not be included in the same group"; "r2 and r5 should not be in the same group"; "r7 should be neither in the first group nor the second group", and so on. In practical implementations of determining project scope, exclusive constraint "r2 and r5 should not be in the same group" could mean that the user does not want to include requirement 2 and requirement 5 into a single project.

It should be noted that user-defined relationship constraints are user defined requests for including a certain requirement into a group and/or for excluding a certain requirement from particular one or more groups, including—but not limited to—inclusive constraints and/or exclusive constraints. They are constraints on requirements additionally raised by the user (e.g., project manager) in order to determine project scope, and have higher priority than the requirement constraints obtained at Step 210. As will be appreciated by one skilled in the art, there are a variety of ways to receive user-defined relationship constraints. For example, the relationship constraints may be obtained by means of human-computer interactions. Specifically, on the monitor of a computer running an embodiment of the inventive method, a user interface (UI) is displayed in which the first grouping scheme generated at Step 220 is displayed in some way.

The user is prompted to enter, in an input area of the UI, the relationship constraints on the first grouping scheme, in a predetermined format that can be recognized by the computer, such as the inclusive constraint and/or the exclusive constraint. Thereby, constraint relationships may be received from the user. Of course, relationship constraints may be stored in computer-readable form into the requirements repository in advance. And user-defined constraints may be retrieved from the requirements repository during or after Step 210. After Step 230, Step 240 will be executed. In Step 240, a set of candidate grouping schemes that satisfy the user-defined relationship constraints are generated based on the first grouping scheme, wherein each candidate grouping scheme in the generated set of candidate grouping schemes comprises one or more groups.

Figure 4:
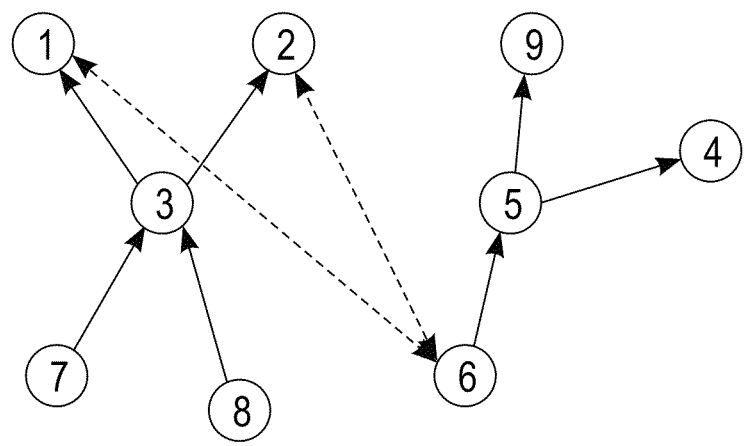
FIG. 4 illustratively depicts a second grouping scheme generated according to an embodiment of the invention.

The user-defined relationship constraints may contain the inclusive constraint only, the exclusive constraint only, or both. The method according to an embodiment of the invention shall determine whether the relationship constraints contain any inclusive constraint as well as whether the relationship constraints contain any exclusive constraint. Based on the content contained in the relationship constraints, corresponding treatment may be taken in Step 240. According to an embodiment of the invention, the user-defined relationship constraints contain an inclusive constraint and an exclusive constraint, and said generating a set of candidate grouping schemes that satisfy the user-defined relationship constraints based on the first grouping scheme comprises: generating a second grouping scheme that satisfies the inclusive constraint based on the first grouping scheme; and generating the set of candidate grouping schemes that satisfy the exclusive constraint based on the second grouping scheme. First, a second grouping scheme that satisfy the inclusive constraint is generated based on the first grouping scheme. Refer to FIG. 4, which illustratively depicts a second grouping scheme generated according to an embodiment of the invention. Specifically, it is assumed that the user-defined inclusive constraint is "if r1 and r2 are in a same group, then r6 should be included into the same group", then the result of the execution of Step 240 is as shown in FIG. 4. As shown, in order to satisfy the request of "if r1 and r2 are in a same group, then r6 should be included into the same group", group 350 and 360 of the first grouping scheme may be combined to generate a second grouping scheme that satisfies the inclusive constraint. In the second grouping scheme, there is only one group G401, which is represented by connected graph 401 in FIG. 4.

In FIG. 4, the dotted line between node 1 and node 6 indicates that there is an inclusive relationship between requirement 1 and requirement r6, i.e., according to the inclusive constraint, r1 and r6 should be included in the same group. Similarly, the dotted line between node 2 and nodes 6 indicates that r2 and r6 should be included in the same group. Obviously, the second grouping scheme also contains one or more groups. They are derived from one or more groups of the first grouping scheme. Then, a set of candidate grouping schemes that satisfy the exclusive constraint is generated based on the second grouping scheme.

Figure 5:
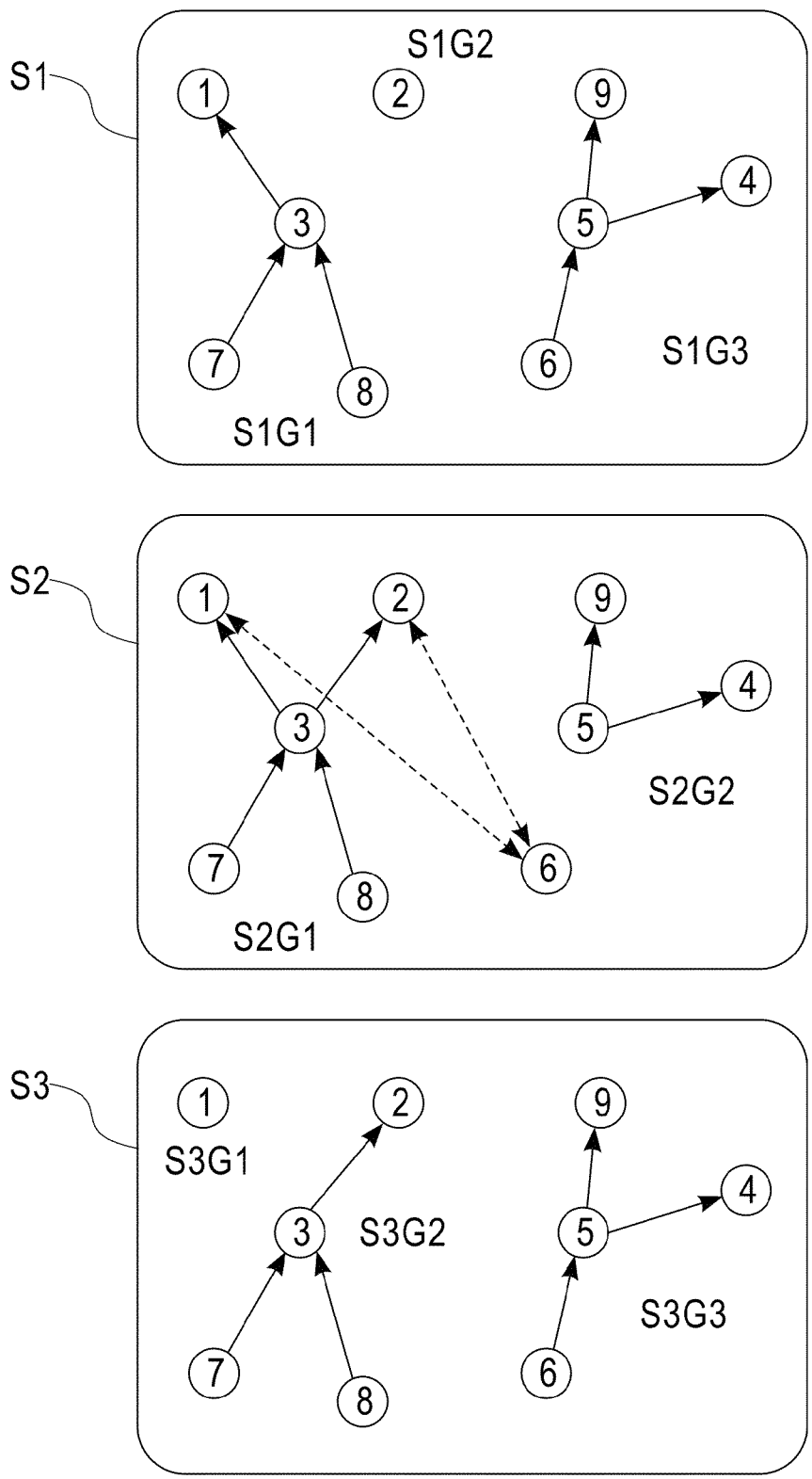
FIG. 5 illustratively depicts a set of candidate grouping schemes generated according to an embodiment of the invention.

Assuming that the user-defined exclusive constraint is "if r2 and r3 is in a group, then r5 should not be included in the same group", then the result of the execution of "generating a set of candidate grouping schemes that satisfy the exclusive constraint based on the second grouping scheme" is as shown in FIG. 5, which illustratively depicts a set of candidate grouping schemes generated according to an embodiment of the invention. The set of candidate grouping schemes S shown in FIG. 5 includes three candidate grouping schemes S1, S1 and S3. Candidate grouping scheme S1 contains three groups S1 G1, S1 G2 and S1 G3, denoted as S1={S1 G1, S1 G2, S1 G3}, wherein group S1 G1 comprises requirements r1, r3, r7 and r8, denoted as S1 G1={r1, r3, r7, r8}. Similarly, S1 G2={r2}, and S1 G3={r4, r6, r6, r9 }. Candidate grouping scheme S2 contains two groups and may be similarly denoted as:
S2={S2G1, S2G2};
S2G1={r1, r2, r3, r6, r7, r8};
S2G2={r4, r6, r9}.
Candidate grouping scheme S3 contains three groups and may be similarly denoted as:
S3={S3G1 , S3G2 , S3G3};
S3G1={r1};
S3G2={r2, r3, r7, r8};
S3G3={r4, r6, r6, r9}.

The order of Step 230 and Step 240 indicates that the user-defined constraints are taken into consideration at a priority higher than requirement dependencies, or dependencies of requirements. In Step 240, a second grouping scheme satisfying the inclusive constraint is generated based on the first grouping scheme first, and then a set of candidate grouping schemes that satisfy the exclusive constraint is generated based on the second grouping scheme, i.e., the set of candidate grouping schemes as shown in FIG. 5 is generated based on the grouping scheme as shown in FIG. 4. That indicates that the priority of considering the exclusive constraint is higher than that of considering the inclusive constraint.

Described above is the manner of handling the situation where the relationship constraints contain not only at least one inclusive constraint, but also at least one exclusive constraint. In practical implementations, there might be the situation where the relationship constraints contain either inclusive constraints only or exclusive constraints only. According to an embodiment of the invention, the relationship constraints comprise only inclusive constraints, and said generating a set of candidate grouping schemes that satisfy the user-defined relationship constraints based on the first grouping scheme comprises: generating a second grouping scheme that satisfies the inclusive constraints based on the first grouping scheme, which serves as said set of candidate grouping schemes. In this embodiment, the process of generating a second grouping scheme that satisfies the inclusive constraints based on the first grouping scheme, for example, is the same as that describe above. However, the second grouping scheme generated will be taken as the candidate grouping scheme for processing in subsequent steps.

According to an embodiment of the invention, the relationship constraints comprise only exclusive constraints, and said generating a set of candidate grouping schemes that satisfy the user-defined relationship constraints based on the first grouping scheme comprises: generating a second grouping scheme that satisfies the exclusive constraints based on the first grouping scheme, which serves as said set of candidate grouping schemes. In this embodiment, the process of generating a second grouping scheme that satisfies the exclusive constraints based on the first grouping scheme is the same as the above described process of generating the set of candidate grouping schemes as shown in FIG. 5 based on the grouping scheme as shown in FIG. 4. Thus, detailed description is omitted herein.

After Step 240, the set of candidate grouping schemes are generated, each of the candidate grouping schemes including one or more groups. Then, the process proceeds to Step 250. The process following Step 240 will be described below with reference to the example set of candidate grouping schemes shown in FIG. 5. In Step 250, combined indicators for the candidate grouping schemes in the set of candidate grouping schemes are calculated according to the requirement constraints.

For example, assume, in the requirement constraints obtained in Step 210, constraints on workload, value and deadline corresponding to requirements 1-9 are as shown in Table 1 below.

TABLE 1

Constraints on workload, value and deadline

| | Requirement | | | | | | | | |
|---|---|---|---|---|---|---|---|---|---|
| | 1 | 2 | 3 | 4 | 5 | 6 | 7 | 8 | 9 |
| Workload | 30 | 300 | 40 | 340 | 250 | 400 | 120 | 60 | 200 |
| Value | 3 | 29 | 4 | 29 | 22 | 30 | 11 | 6 | 19 |
| Deadline | 09-13 | 09-13 | 10-13 | 12-13 | 12-13 | 12-13 | 10-13 | 10-13 | 12-31 |

Table 1 lists workload constraints respectively for requirements 1 to 9. Based on the workload constraints for requirements 1 to 9, a combined indicator of workload for each of the candidate grouping schemes may be calculated.

In project management practice, projects are often subject to pre-determined constraints, for example, predefined maximum workload allowed for a single project, resource limitations of individual projects, deadline restrictions, and so on. By calculating a combined indicator for each candidate grouping scheme, including a total workload, for example, of a group in the candidate grouping scheme, it may be identified whether the total workload of the group of a candidate grouping scheme exceeds the predefined maximum workload allowed for a single project.

Refer to FIG. 6, a table showing combined indicators, calculated according to an embodiment of the invention, of individual candidate grouping schemes of the set of candidate grouping schemes shown in FIG. 5. The table shown in FIG. 6 contains combined indicators respectively for candidate grouping schemes S1, S2 and S3 from the set of candidate grouping schemes shown in FIG. 5. In the table, Table header "No. of Groups" indicates the number of groups included in a candidate grouping scheme; Table headers "G1", "G2" and "G3" respectively indicate group 1, group 2 and group 3 of a corresponding candidate grouping scheme.

Table header "Workload" indicates the workload of each group of a candidate grouping scheme, which is the sum of workloads for all requirements included in the group, and the unit of measurement is "person•day", for example; Table header "Value" indicates the value of each group of a candidate grouping scheme, which is the sum of values for all requirements included in the group, and the unit of measurement is "thousand dollars", for example; Table header "Deadline" indicates the deadline for each group of a candidate grouping scheme, which is the latest one of all deadlines for all requirements included in the group, and the format is "Month-Day". For example, candidate grouping scheme S1 has three groups: Group 1 (G1), Group 2 (G2) and Group 3 (G3). The workload of Group 1 (G1) is 250, which is calculated as follows. Group 1 (G1) is S1 G1 as shown in FIG. 5. The workload of Group 1 (G1) is the sum of the workloads for all requirements r1, r3, r7 and r8 in S1 G1. According to Table 1, workloads for r1, r3, r7 and r8 are respectively 30, 40, 120 and 60. Their sum is 250. Similarly, it may be calculated that the value and the deadline for Group 1 (G1) are respectively 24 and 09-13. Similarly, it may calculated that the workload, the value and the deadline for Group 2 (G2) are respectively 300, 29 and 09-13; and the workload, the value and the deadline for Group 3 (G3) are respectively 1190, 100 and 12-13. The above description illustrates how to calculate the combined indicator for candidate grouping scheme S1. In a similar way, combined indicators for candidate grouping scheme S2 and candidate grouping scheme S3 may also be calculated. In Step 260, each candidate grouping schemes and its corresponding combined indicators are displayed. The combined indicator of a candidate grouping scheme may generally comprise one or more of the following: the number of groups included in the candidate grouping scheme; the total workload of each group in the candidate grouping scheme the total value of each group in the candidate grouping scheme; and the latest deadline of each group in the candidate grouping scheme.

For example, candidate grouping schemes S1, S2 and S3 as shown in FIG. 5 and the combined indicators as shown in FIG. 6 may be displayed in a user interface on the computer screen. The candidate grouping schemes and the combined indicators may be displayed in combination in various ways. For example, the combined indicators of the multiple candidate grouping schemes as shown in FIG. 5 may be displayed in one table as shown in FIG. 6, or in multiple tables; each candidate grouping scheme may be displayed prior to displaying combined indicators; or each grouping scheme may be displayed together with its combined indicators. In addition, the requirement constraints as shown in Table 1 may also be displayed. In addition, the rendering format of candidate grouping schemes, combined indicators and requirement constraints may be different from the rendering format as shown in FIG. 5, FIG. 6 and Table 1. As will be readily appreciated by one skilled in the art, there are various forms of display and presentation, thus it is not necessary to give detailed explanation here.

The purpose of displaying candidate grouping schemes and their respective combined indicators is to allow the user, who is interacting with the computer, especially the project manager, to visually understand the detail of the candidate grouping schemes so as to measure, from the perspective of project, whether each of the groups included in a candidate grouping scheme would suitably constitute a project. For example, the project manager notices from the user interface that the workloads of the two groups included in candidate grouping scheme S2 are 950 and 790 respectively (see FIG. 6), which is relatively balanced and suitable for the current status of resources (e.g., human resources) available for project development. Then, she/he would select candidate grouping scheme S2. This means the project manager shall determine a project scope according to details of requirements r1, r2, r3, r7 and r8 in group S2 G1 of candidate grouping scheme S2, and shall determine another project scope according to details of requirements r4, r5 and r9 in group S2 G2 of candidate grouping scheme S2. The step of the user making selection is shown by block 270 in FIG. 2.

According to an embodiment of the invention, a user interface may be provided for optimizing the selected candidate grouping scheme. As indicated by the dotted arrow from Step 270 to Step 230 in FIG. 2, after the user selects candidate grouping scheme S2, if he wants to optimize the candidate grouping scheme S2, he may return to Step 230 via the user interface, where subsequent steps may be executed to optimize the candidate grouping scheme S2. In practical implementations, the process of Step 230 to Step 270 may be repeatedly executed, until the user has obtained a satisfactory grouping scheme.

Figure 7:
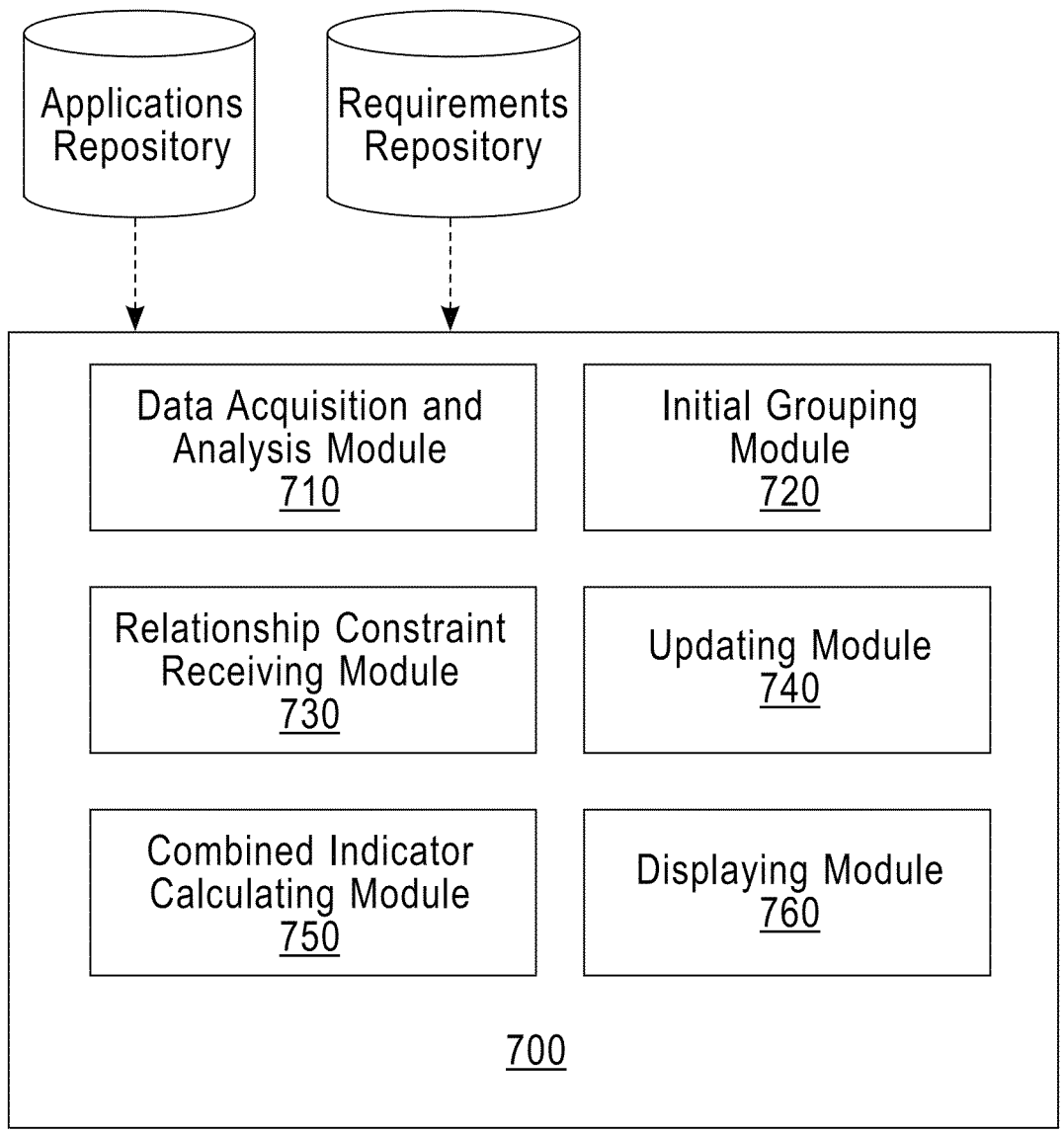
FIG. 7 is a block diagram of an apparatus for assisting the determination of project scope according to an embodiment of the invention.

The user may define a project scope according to each group of the finally obtained grouping scheme, thereby defining optimized project scopes. The method for assisting the determination of project scope according to various embodiments of the invention is described above. According to the same inventive concept, the present invention also provides an apparatus for assisting the determination of project scope. FIG. 7 shows a block diagram of an apparatus 700 for assisting the determination of project scope according to an embodiment of the invention. As shown in the figure, the apparatus 700 comprises a data acquisition and analysis module 710, an initial grouping module 720, a relationship constraint receiving module 730, an updating module 740, a combined indicator calculation module 750 and a displaying module 760. The data acquisition and analysis module 710 is configured to obtain requirements, requirement dependencies and requirement constraints. The initial grouping module 720 is configured to generate a first grouping scheme according to the requirement dependencies, wherein the requirements are divided into one or more groups so that requirements having a dependency are included into a same group.

The relationship constraint receiving module 730 is configured to receive user-defined relationship constraints. As described above, requirements, requirement dependencies and requirement constraints can be obtained from a requirements repository. The updating module 740 is configured to generate a set of candidate grouping schemes that satisfy the user-defined relationship constraints based on the first grouping scheme, wherein each candidate grouping scheme in the set of candidate grouping schemes comprises one or more groups. The combined indicator calculating module 750 is configured to calculate a combined indicator for each candidate grouping scheme in the set of candidate grouping schemes according to the requirement constraints. The displaying module 760 is configured to display each candidate grouping scheme in the set of candidate grouping schemes and its corresponding combined indicator. According to an embodiment of the invention, the relationship constraints comprise at least one of: an inclusive constraint, which is the demand that a certain requirement shall be included into the same group as another requirement; an exclusive constraint, which is the demand that a certain requirement shall not be included into the same group as another requirement and/or a certain requirement shall not be included into particular one or more groups.

According to an embodiment of the invention, the updating module is configured to, in response to the determination of the relationship constraints comprising an inclusive constraint and an exclusive constraint, generate a second grouping scheme that satisfies the inclusive constraint based on the first grouping scheme; and generate a set of candidate grouping schemes that satisfy the exclusive constraint based on the second grouping scheme. According to an embodiment of the invention, the updating module is configured to, in response to the determination of the relationship constraints comprising only inclusive constraints, generate a second grouping scheme that satisfies the inclusive constraints based on the first grouping scheme, which serves as the set of candidate grouping schemes.

According to an embodiment of the invention, the updating module is configured to, in response to the determination of the relationship constraints comprising only exclusive constraints, generate a second grouping scheme that satisfies the exclusive constraints based on the first grouping scheme, which serves as the set of candidate grouping schemes. According to an embodiment of the invention, the requirement dependencies comprise direct requirement dependencies. According to an embodiment of the invention, the requirements are requests for change that aim at different existing applications and the requirement dependencies further comprise indirect requirement dependencies, and the apparatus is further configured to: obtain the dependency relationship of the applications aimed at by the requirements; and derive the indirect dependency of any two of the requirements according to the dependency relationship of the applications aimed at by the requirements. According to an embodiment of the invention, the combined indicator of each of the candidate grouping schemes comprises one or more of the following: the number of groups included in the candidate grouping scheme; the total workload of each group in the candidate grouping scheme; the total value of each group in the candidate grouping scheme; and the latest deadline of each group in the candidate grouping scheme.

Figure 8:
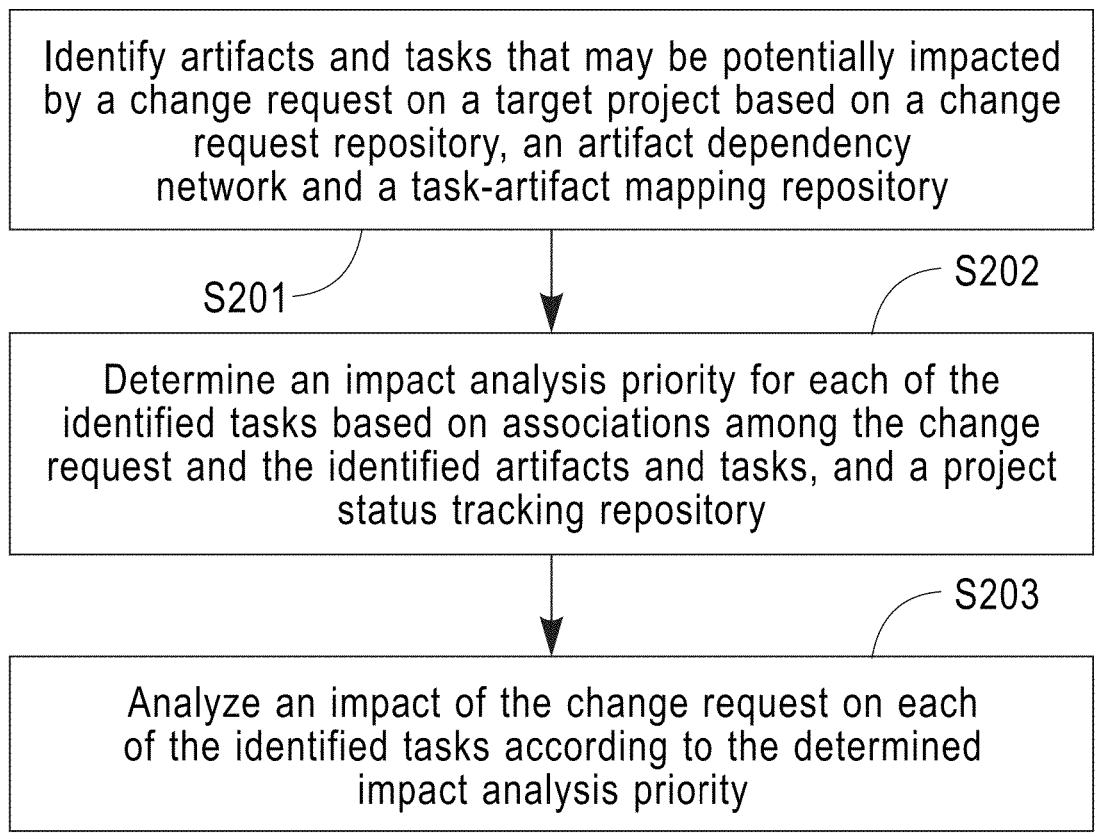
FIG. 8 illustrates a flowchart of a method for impact analysis of change requests according to an embodiment of the present invention.

FIG. 8 schematically shows a flowchart of a method for impact analysis of change requests according to an embodiment of the present invention. As shown in FIG. 8, in step S201, there are identified artifacts and tasks that may be potentially impacted by a change request on a target project based on a change request repository, an artifact dependency network and a task-artifact mapping repository. It should be understood that the "artifacts and tasks that may be potentially impacted by a change request on a target project", as used herein, refers to artifacts and tasks that will be impacted by implementing the change indicated by a change request on a target project once the change request is accepted.

In an embodiment, identifying artifacts and tasks that may be potentially impacted by a change request on a target project comprises: creating an impact propagation model based on the change request repository, the artifact dependency network, and the task-artifact mapping repository, and traversing the impact propagation model to identify artifacts and tasks that may be potentially impacted by the change request on the target project.

Figure 9:
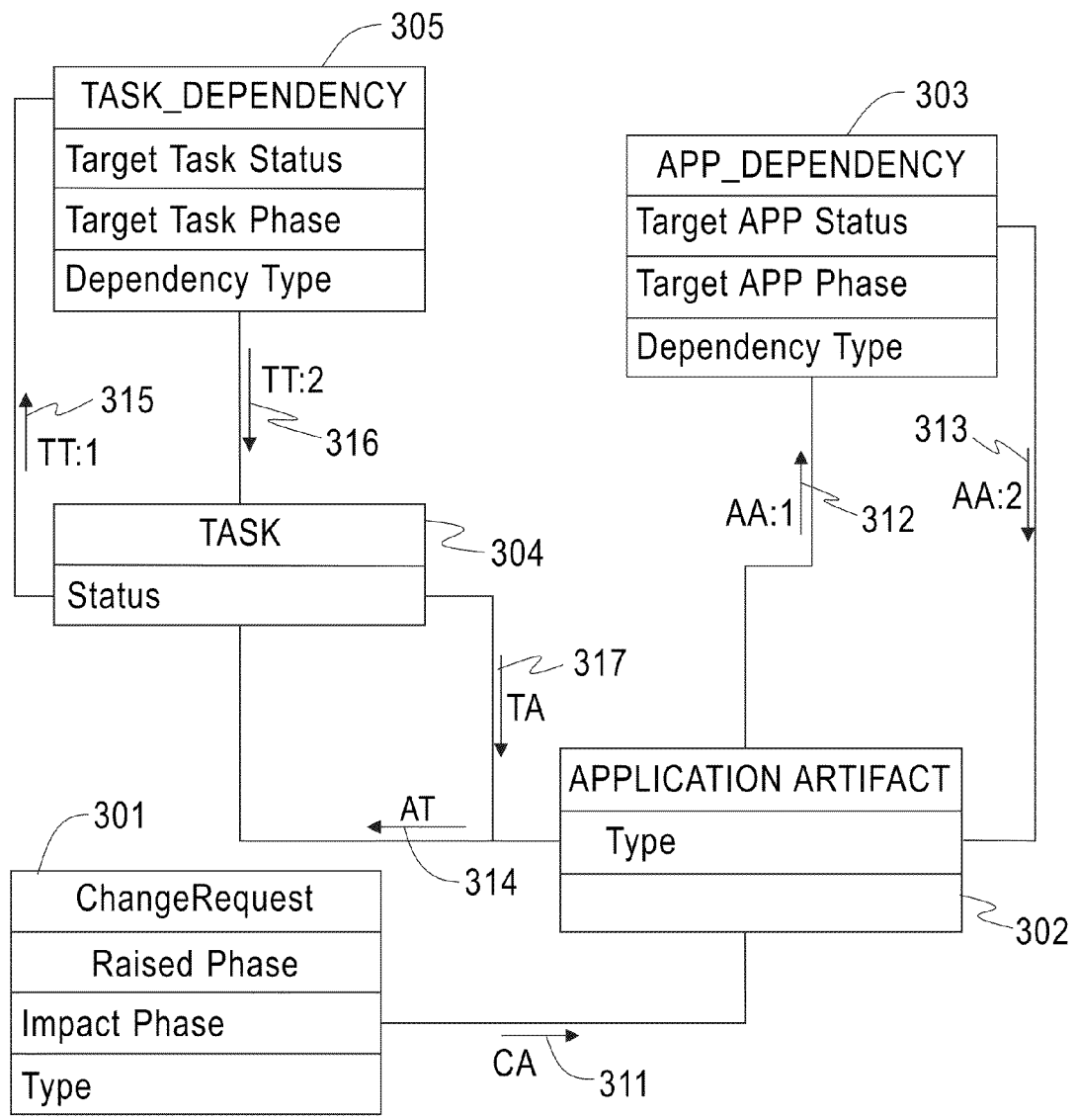
FIG. 9 illustrates a specific example of an impact propagation model.

In a specific example, the impact propagation model is a class diagram created by using Unified Modeling Language (UML), as shown in FIG. 9. The class diagram as shown in FIG. 3 comprises five classes: a ChangeRequest class 301, an APPLICATION ARTIFACT class 302, an APP_DEPENDENCY class 303, a application-associated TASK class 304, and a TASK_DEPENDENCY class 305.

Figure 10:
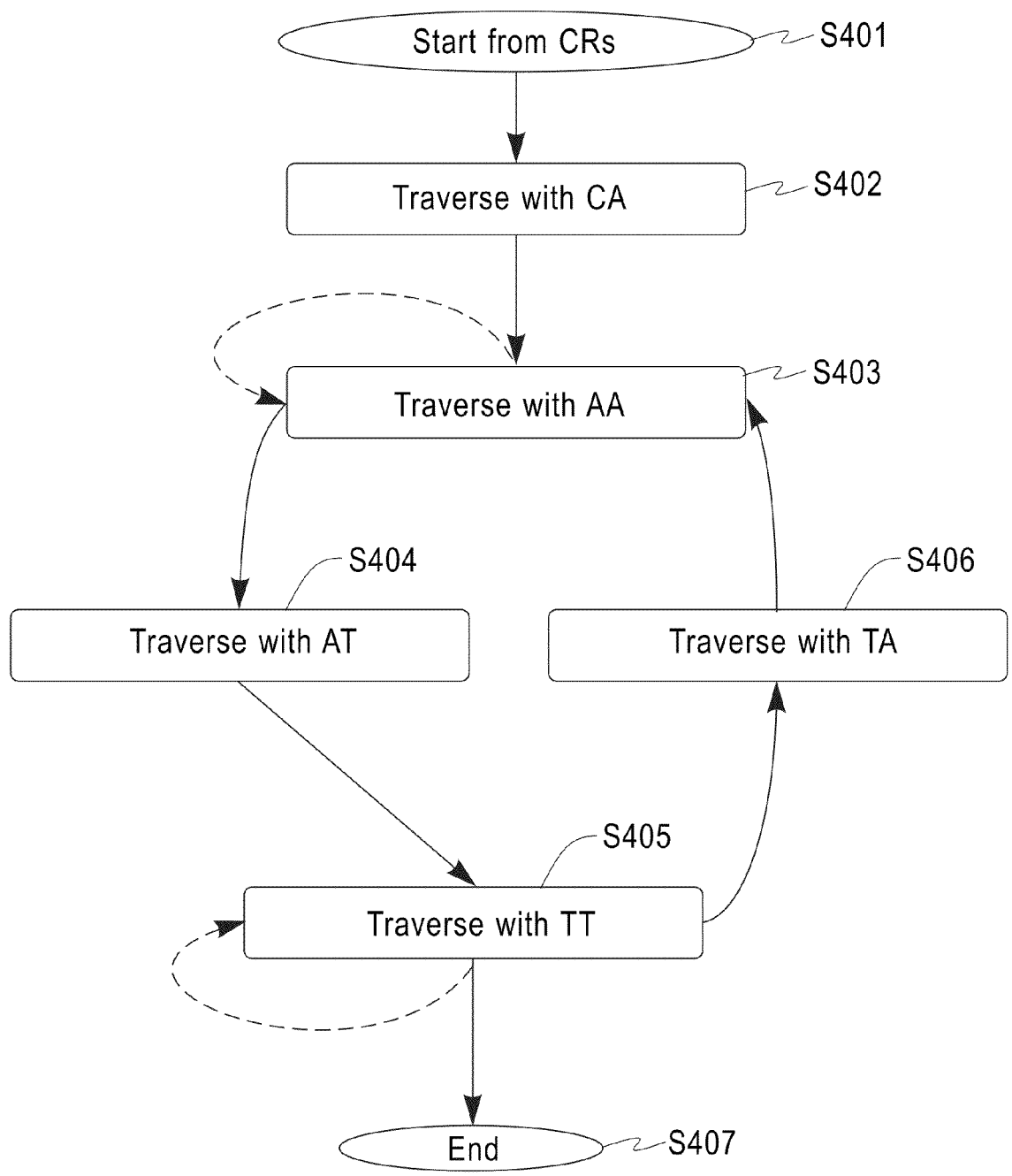
FIG. 10 illustrates a process of traversing the impact propagation model as shown in FIG. 9.

FIG. 10 schematically shows a process of traversing the impact propagation model as shown in FIG. 9. First of all, in step S401, the process starts from change request (CR) nodes. In step S402, the traverse proceeds with a CR->APP (CA) path as shown by an arrow 311 in FIG. 9, so as to identify a first set of applications directly impacted by the change requests. In step S403, the traverse proceeds with an APP->APP (AA) path as shown by arrows 312 and 313 in FIG. 9, so as to identify a second set of applications dependent on the first set of applications. In step S404, the traverse proceeds with an APP->TASK (AT) path as shown by an arrow 314 in FIG. 9, so as to identify a first set of tasks and a second set of tasks associated with the first set of applications and the second set of applications, respectively. In step S405, the traverse proceeds with a TASK->TASK (TCT) path as shown by arrows 315 and 316 in FIG. 9, so as to identify a third set of tasks and a fourth set of tasks associated with the first set of tasks and the second set of tasks, respectively. In step S406, the traverse proceeds with a TASK->APP (TA) path as shown by an arrow 317 in FIG. 9, so as to identify a third set of applications and a fourth set of applications associated with the third set of tasks and the fourth set of tasks, respectively. Afterwards, the process returns to step S403, continues to perform steps S403 to S406 iteratively, and ends (step S407) until no new node is found. In this manner, all sets of applications and all sets of tasks identified by the above process of traversing are determined as artifacts and tasks that may be potentially impacted by the change request on the target project.

Figure 11:
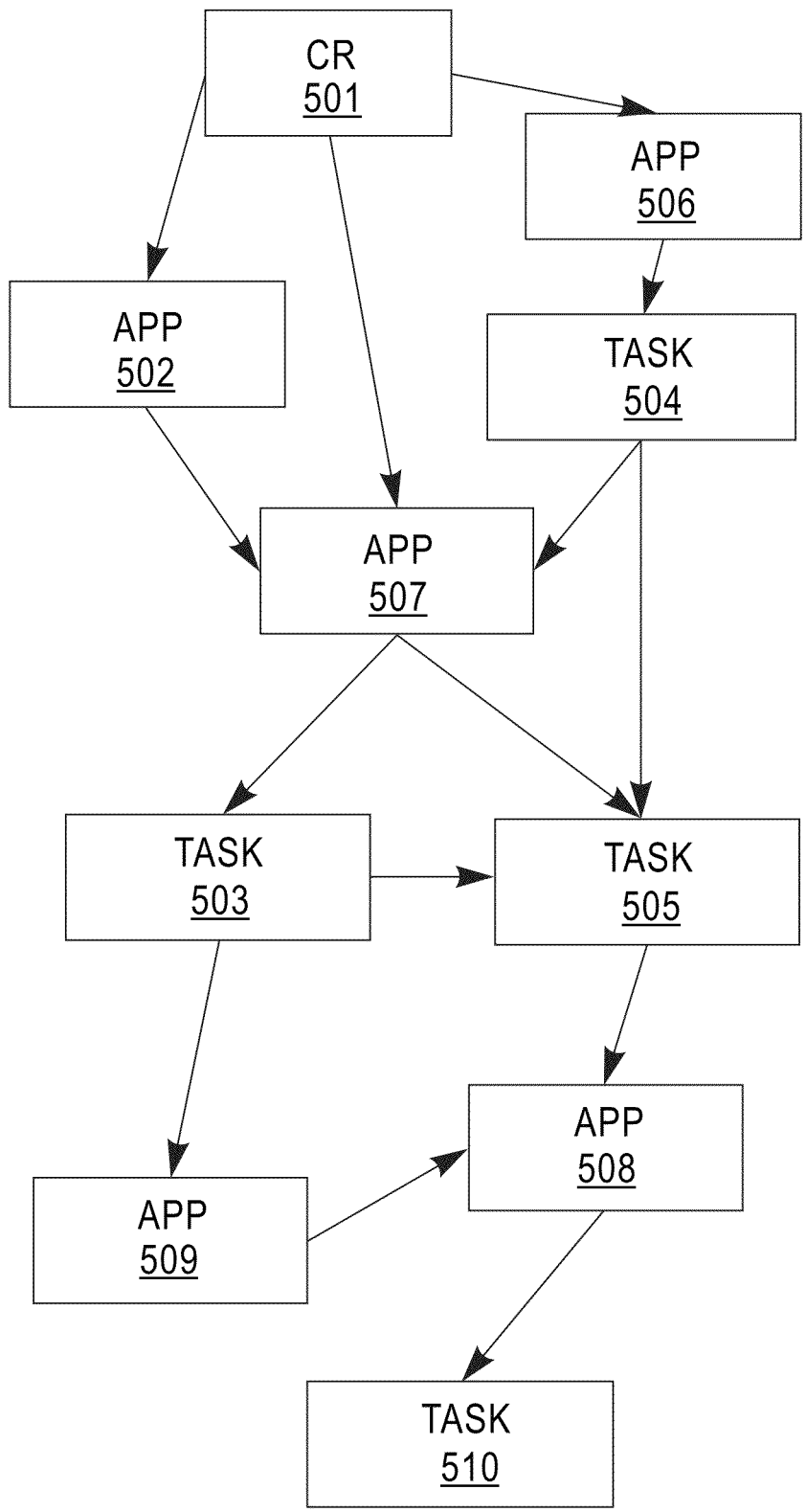
FIG. 11 shows an exemplary result of performing the process of traversing as shown in FIG. 10.

FIG. 11 shows an exemplary result of performing the process of traversing as shown in FIG. 4. The result indicates associations between a change request and the identified applications and tasks. It is to be noted that solid lines with arrows indicate that source nodes impact target nodes in FIG. 11. A node CR 501 illustrates a change request on a target project. Nodes APP 502 and APP 506 illustrate applications directly impacted by CR 501. A node TASK 504 illustrates a task associated with APP 506. A node APP 507 illustrates an application dependent on APP 502. A node TASK 503 illustrates a task associated with APP 507. A node TASK 505 illustrates a task associated with TASK 503. A node APP 509 illustrates an application associated with TASK 503. A node APP 508 illustrates an application dependent on APP 509. A node TASK 510 illustrates a task associated with APP 508.

Figure 12:
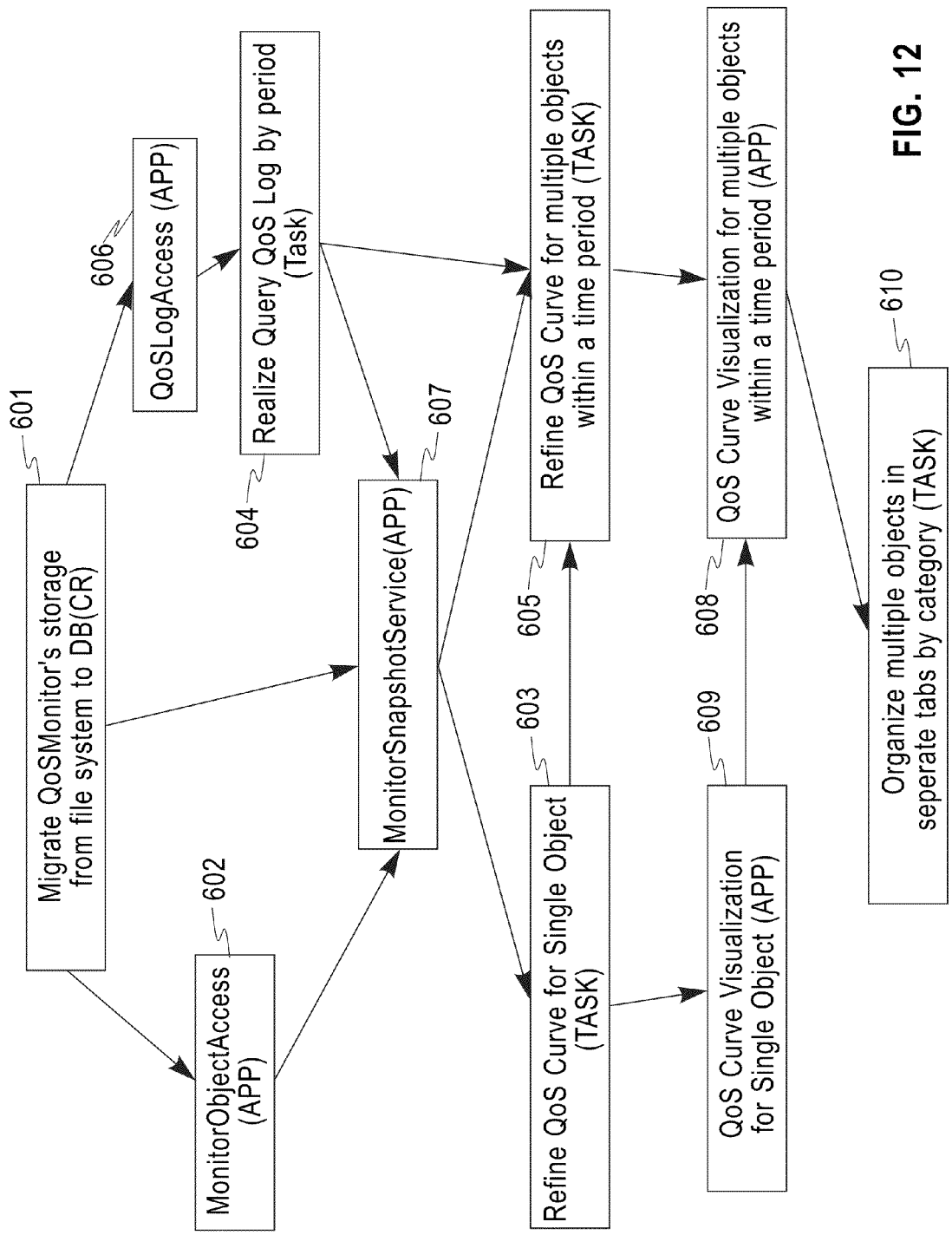
FIG. 12 shows a result of traversing an impact propagation model in a specific application scenario.

FIG. 12 shows a result of traversing an impact propagation model in a specific application scenario. FIG. 6 has a completely same topological structure as FIG. 11, wherein nodes 601 to 610 correspond to nodes 501 to 510 in FIG. 11 respectively. FIG. 12 differs from FIG. 11 only in that each of the nodes in FIG. 12 is provided with specific semantics.

Return to FIG. 8, in step S202, there is determined an impact analysis priority for each of the identified tasks based on associations among the change request and the identified artifacts and tasks, and a project status tracking repository. As understood by those skilled in the art, the project status tracking repository is configured to maintain statuses of all tasks in projects, such as in trouble, warning, healthy, etc. In an embodiment, determining an impact analysis priority for each of the identified tasks based on associations among the change request and the identified artifacts and tasks, and a project status tracking repository comprises: calculating a first impact probability and a first impact severity of the change request for each of the identified tasks based on the statuses of the tasks obtained from the project status tracking repository.

The process of calculating the first impact probability and first impact severity may be automatically implemented by the system in a predetermined manner. Therefore, the calculated first impact probability and first impact severity may be used as system evaluation values of impact probability and impact severity, respectively. The process of calculating the first impact probability and first impact severity of the change request for each of the identified tasks based on the statuses of the tasks obtained from the project status tracking repository may proceed in a manner familiar to those skilled in the art and thus is not described in detail herein. When both the calculated first impact probability and the calculated first impact severity for a certain identified task are lower than respective predefined thresholds, a lowest impact analysis priority may be given to the task.

Hereinafter, detailed descriptions are presented with reference to FIGS. 11 and 13 to illustrate how to determine an impact analysis priority for each of the identified tasks based on associations among the change request and the identified artifacts and tasks, and a project status tracking repository. As described above, the result of traversing the impact propagation model as shown in FIG. 11 indicates associations between a change request on a target project and the identified applications and tasks that may be potentially impacted by the change request.

Figure 13:
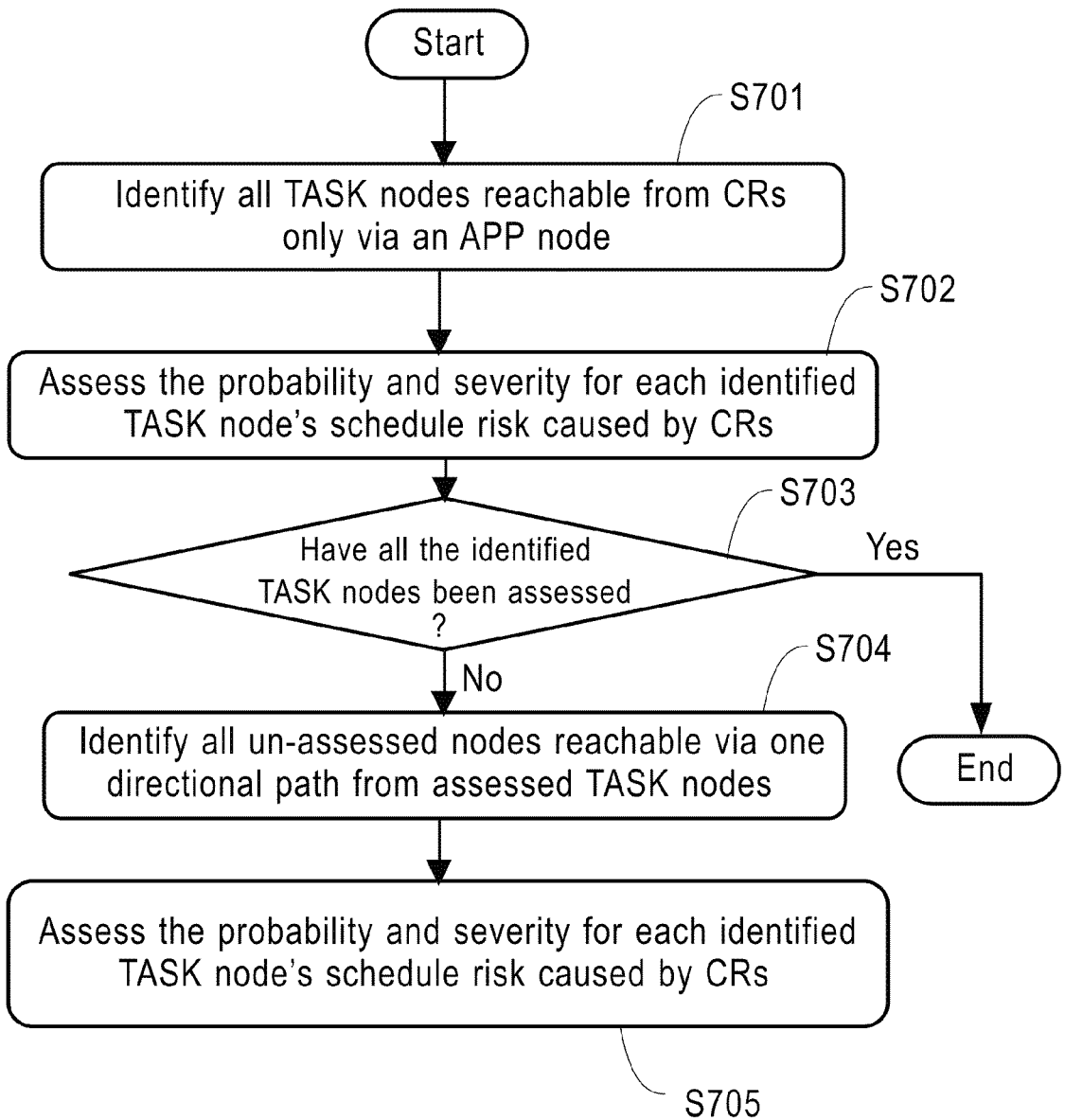
FIG. 13 schematically shows a flowchart of determining a sequence of impact analysis for the identified tasks.

FIG. 13 schematically shows a flowchart of determining the sequence (i.e. priority) of impact analysis for the identified tasks from FIG. 11 which is shown as an association diagram. It should be understood that the process as shown in FIG. 7 is an iterative process. In the first iteration, in step S701, there are identified all TASK nodes reachable from CRs only via an APP node. Here, the identified node is the node TASK 504 in FIG. 11. Optionally, in step S702, there is assessed the probability and severity for each identified TASK node's schedule risk caused by CRs. In step S703, there is determined whether or not all the identified TASK nodes have been assessed. If yes, then the process ends; otherwise, the process proceeds to step S704 to perform the second iteration. In step S704, there is identified all un-assessed nodes reachable via one directional path from the assessed TASK nodes. Here, the identified node is the node TASK 503 in FIG. 11. Next in step S705, there are assessed the probability and severity (i.e. the first impact probability and first impact severity) for each identified TASK node's schedule risk caused by CRs.

Afterwards, the process returns to step S703 to perform the third iteration. After the third iteration ends, the process continues to perform the fourth iteration. After the fourth iteration ends, the process ends. In this manner, TASK 504, TASK 503, TASK 505 and TASK 510 on which the change request impact analysis will be made are identified through the first, second, third and fourth iterations respectively, as shown in FIG. 8. Therefore, the respective impact analysis priority is determined according to the sequence TASK 504, TASK 503, TASK 505, TASK 510, i.e., impact analysis priorities are given to TASK 504, TASK 503, TASK 505 and TASK 510 in decreasing order.

Return to FIG. 8, in step S203, there is analyzed an impact of the change request on each of the identified tasks according to the determined impact analysis priority. In an embodiment, analyzing an impact of the change request on each of the identified tasks according to the determined impact analysis priority comprises: calculating a second impact probability and a second impact severity of the change request for each of the identified tasks as actual values of the respective impact probability and impact severity.

In an embodiment, analyzing an impact of the change request on each of the identified tasks according to the determined impact analysis priority further comprises: generating an impact analysis context for each of the identified tasks, and analyzing an impact of the change request on each of the identified tasks based on the generated impact analysis context. Specifically, by taking the association diagram between a change request and the identified applications and tasks that may be potentially impacted by the change request as shown in FIG. 11 for example, generating the impact analysis context comprises: for each of the identified tasks (tasks to be analyzed), generating an original association sub-diagram from the association diagram as shown in FIG. 11, wherein the original association sub-diagram comprises all directional paths from CR nodes to task nodes to be analyzed. Preferably, in order to simplify the impact analysis process, the original association sub-diagram (i.e., impact analysis context) may be optimized to obtain an optimized association sub-diagram. For example, an original association sub-diagram for a task having a lower impact analysis priority is compared with an original association sub-diagram for a task having a higher impact analysis priority so as to find common directional path segments between them, and then APP nodes and CR nodes on the common directional path segments are removed while TASK nodes are retained. Thus, there is obtained an optimized impact analysis context for the task having the lower impact analysis priority.

FIG. 9 schematically shows optimized impact analysis contexts generated for TASK 504, TASK 503, TASK 505 and TASK 510 in FIG. 11. In an upper-left corner of FIG. 9, there is shown an original impact analysis context generated for TASK 504, wherein from node CR 501 to TASK 504 there exists only one directional path, i.e., CR 501→APP 506→TASK 504. As described above, since the higher impact analysis priority is given to TASK 504, the original impact analysis context for TASK 504 needs no optimization. In an upper-right corner of FIG. 9, there is shown an optimized impact analysis context generated for TASK 503. The original impact analysis context (not shown) for TASK 503 comprises three directional paths from node CR 501 to TASK 503, i.e., P1: CR 501→APP 502→APP 507→TASK 503, P2: CR 501→APP 507→TASK 503, and P3: CR 501→APP 506→TASK 504→APP 507→TASK 503. The impact analysis on TASK 504 has been performed based on the impact analysis context for TASK 504 before performing impact analysis on TASK 503, and the impact of CR 501 directly impacting the node APP 506 on TASK 504 associated with APP 506 is analyzed in the process of impact analysis on TASK 504. Thus, for the purposes of simplifying the subsequent process of impact analysis on TASK 503, the original impact analysis context for TASK 503 is compared with the original impact analysis context for TASK 504 so as to find a common directional path segment CR 501→APP 506→TASK 504. Then, nodes CR 501 and APP 506 on the common directional path segment are removed while the node TASK 504 is retained. Thus, during the process of impact analysis on TASK 503, the impact of CR 501 on TASK 504 via APP 506 does not need to be analyzed repetitively, but the previous result of impact analysis on TASK 504 can be used directly. In a lower-left corner of FIG. 9, there is shown an optimized impact analysis context generated for TASK 505. The original impact analysis context (not shown) for TASK 505 comprises three directional paths, i.e., P4: CR 501→APP 502→APP 507→TASK 503→TASK 505, P5: CR 501→APP 506→TASK 504→APP 507→TASK 505, and P6: CR 501→APP 506→TASK 504→TASK 505. Since the directional path P4 (CR 501→APP 502→APP 507→TASK 503→TASK 505) in the original impact analysis context for TASK 505 and the directional path P1 (CR 501→APP 502→APP 507→TASK 503) in the original impact analysis context for TASK 503 have a common path segment CR 501→APP 502→APP 507→TASK 503, an optimized path P4' TASK 503→TASK 505 for the directional path P4 is obtained after removing the nodes CR 501, APP 502 and APP 507 from the common path segment of the directional path P4. In the same manner, an optimized path P5' TASK 504→APP 507→TASK 505 for the directional path P5 and an optimized path P6' TASK 504→TASK 505 for the directional path P6 are obtained. Therefore, with the optimized paths P4', P5' and P6', there is obtained the optimized impact analysis context for TASK 505 as shown in the lower-left corner of FIG. 9. Likewise, the optimized impact analysis context generated for TASK 510 is obtained, as shown in a lower-right corner of FIG. 9.

In an embodiment, generating an impact analysis context comprises: generating an impact analysis context for a task having a lower impact analysis priority based on a result of impact analysis on tasks having higher impact analysis priorities. In this regard, what is shown in FIG. 9 is a universal set of the optimized impact analysis contexts generated for TASK 503, TASK 504 and TASK 510. In practice, however, each of the impact analysis contexts generated for TASK 503, TASK 504 and TASK 510 may be a subset of the universal set as shown in FIG. 9. Take the impact analysis context for TASK 503 for example. If it is determined through analysis that no impact will be exerted on TASK 504 or the impact on TASK 504 is within acceptable range where the CR 501 is accepted, the impact analysis context for TASK 503 may not comprise a path from TASK 504 to APP 507.

In an embodiment, the impact analysis method for change requests further comprises: generating a first graphical user interface based on the determined impact analysis priorities and the generated impact analysis contexts. The first graphical user interface is operable to allow the user to trigger task impact analysis for tasks.

Figure 16:
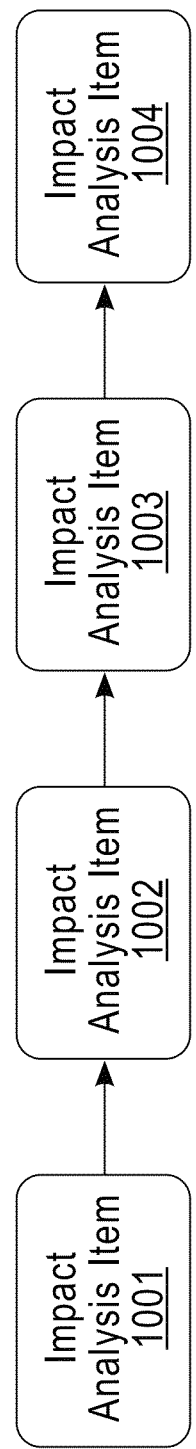
FIG. 16 illustrates a first graphical user interface according to an embodiment of the present invention.

FIG. 16 schematically shows an example of the first graphical user interface. In the graphical user interface in FIG. 10, there are shown four impact analysis items 1001, 1002, 1003 and 1004, which correspond to to-be-analyzed tasks TASK 504, TASK 503, TASK 505 and TASK 510 in FIG. 9 respectively. The impact analysis items 1001, 1002, 1003 and 1004 are arranged in the order as shown by arrows, indicating that the impact analysis on TASK 504 occurs prior to TASK 503, the impact analysis on TASK 503 occurs prior to TASK 502, and so on. For example, when it is necessary to make an impact analysis on TASK 503, the user may select corresponding impact analysis item 1003, right-clicks whereby a menu will pop up, and then selects a "send notification" option in the menu, thereby triggering impact analysis on TASK 503.

In an embodiment, impact analysis items corresponding to analyzed and unanalyzed tasks, respectively, may be displayed in different colors or gray levels. For example, in order to trigger impact analysis on TASK 503, the impact analysis items 1001 and 1002 are clicked on while the impact analysis items 1003 and 1004 are not yet clicked on, so the impact analysis items 1001 and 1002 are shown in dark gray while the impact analysis items 1003 and 1004 are shown in shallow gray.

Figure 15:
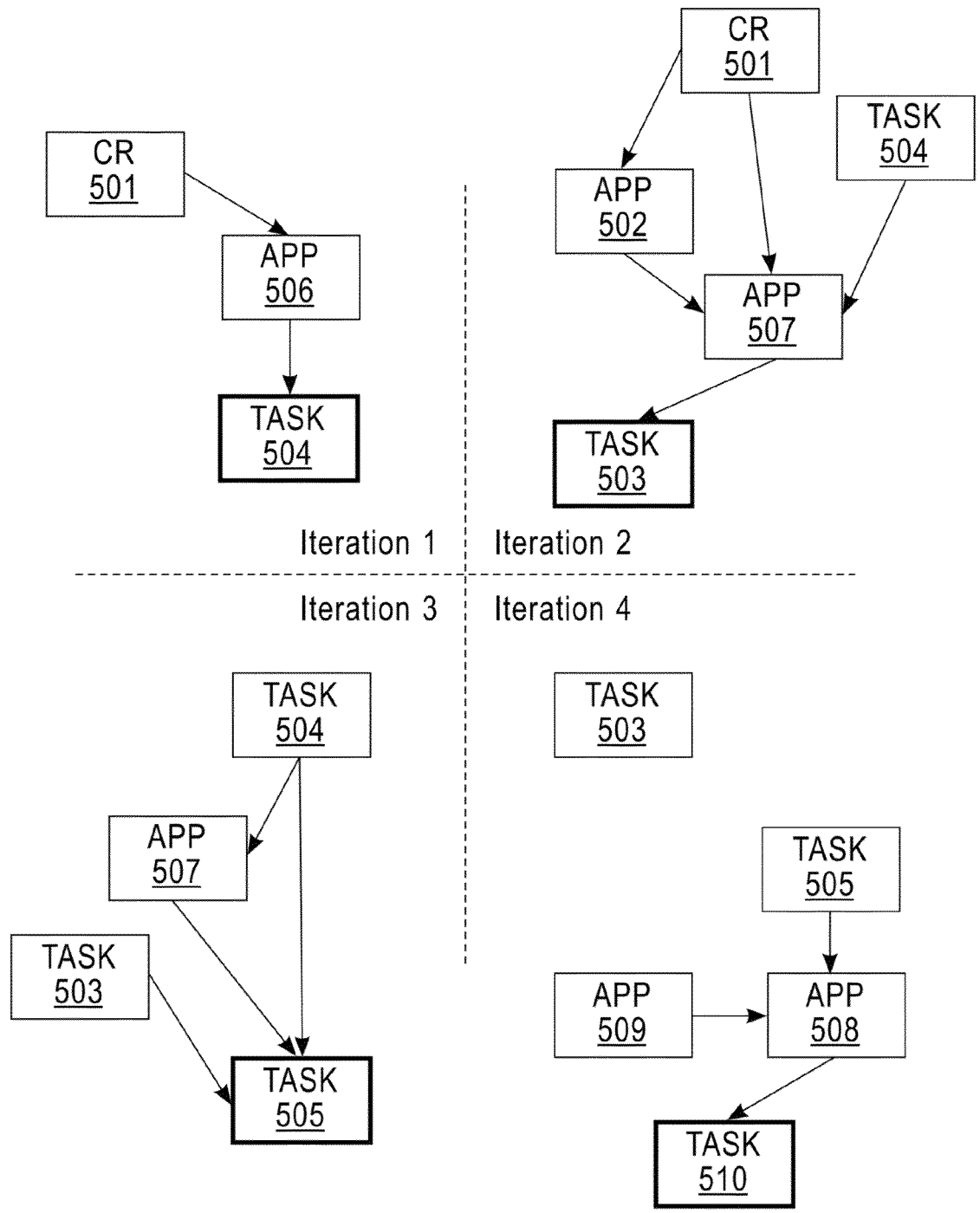
FIG. 15 illustrates impact analysis contexts generated for task nodes.

In an embodiment, the impact analysis method for change requests further comprises: in response to a user's triggering, sending, based on an impact analysis context, a notification to subjects involved in the impact analysis context so that the involved subjects can jointly analyze the impact of the change request on the target project on the to-be-analyzed task in response to the notification. For example, regarding the impact analysis context for TASK 503 as shown in FIG. 15, since TASK 503 is associated with APP 502, APP 507 and TASK 504, a notification needs to be sent to subject matter experts (SMEs) of APP 502 and APP 507 and the owner of TASK 504 so that they can jointly make the impact analysis on TASK 503.

In an embodiment, in response to a user's triggering, sending, based on an impact analysis context, a notification to subjects involved in the impact analysis context comprises: generating a second graphical user interface, wherein the second graphical user interface is operable to present impact-analysis-related items. The impact-analysis-related items include, but are not limited to: start time and end time of impact analysis, lists of attendees for impact analysis (including a list of required attendees and a list of optional attendees), location of impact analysis, impact analysis contexts, and url of impact analysis wizard.

Figure 17:
FIG. 17 illustrates a screenshot of a second graphical user interface according to an embodiment of the present invention.

FIG. 17 schematically shows a screen shot of the second graphical user interface. The second graphical user interface may be associated with a mail system, for example. In the second graphical user interface as shown in FIG. 17, there are presented a start time of impact analysis 1101, an end time of impact analysis 1102, a list of required attendees for impact analysis 1103, a list of optional attendees for impact analysis 1104, a location of impact analysis 1105, impact analysis contexts 1106 and a url of impact analysis wizard 1107 as attachments. The second graphical user interface may further be operable to allow users to define these impact-analysis-related items.

In an embodiment, the second graphical user interface may be generated in response to the user operating on the first graphical user interface. For example, the second graphical user interface as shown in FIG. 17 is generated in response to the user selecting the impact analysis item 1003 in the first graphical user interface as shown in FIG. 16 and selecting "send notification" in a popup menu.

In an embodiment, the impact analysis wizard is configured to record results of impact analysis, e.g. including the second impact probability and the second impact severity as described above, so as to analyze an impact of the change request on a task having a lower impact analysis priority based on the analyzing for one or more tasks having higher impact analysis priorities.

It should be understood although the process of identifying artifacts and tasks that may be potentially impacted by a change request on a target project has been described by taking the impact propagation model created by using the UML language as an example, the implementation of the method of the present invention is not limited to any specific impact propagation model.

In an embodiment, the impact analysis method for change requests according to the present invention further comprises: identifying, based on the change request repository and the artifact dependency network, correlations among a plurality of change requests directly impacting a plurality of artifacts respectively; and estimating a workload required for implementing a change indicated by each of the plurality of change requests based on the correlations among the plurality of change requests. Detailed description is presented below to illustrate this embodiment of the present invention with reference to FIGS. 12-16.

Figure 18:
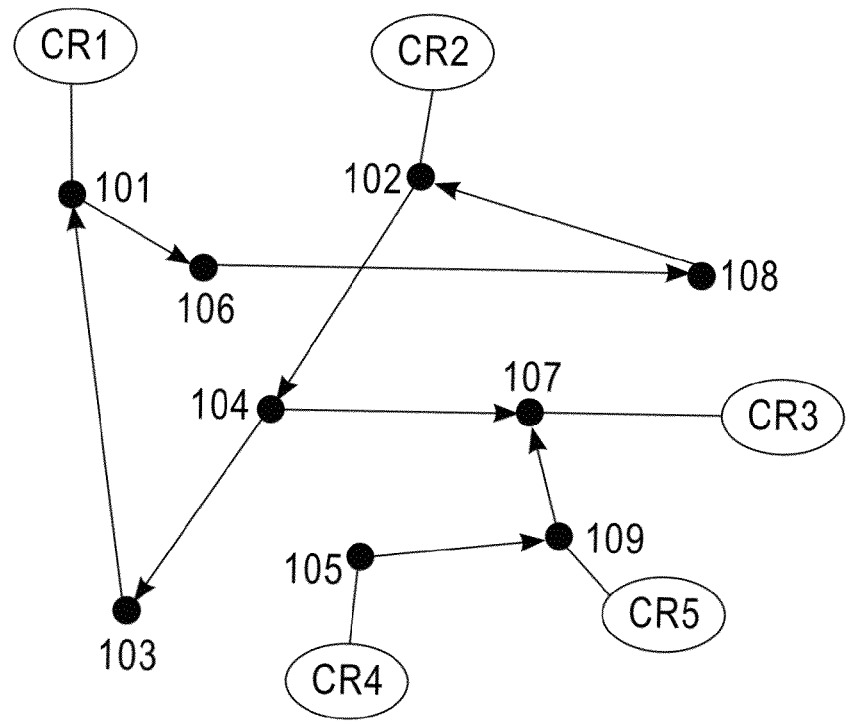
FIG. 18 shows a schematic representation of a change request-application mapping diagram obtained based on a change request repository and an artifact dependency network.

FIG. 18 shows a schematic representation of a change request-application mapping diagram obtained based on the change request repository and the artifact dependency network. In FIG. 18, there are shown inter-dependent applications 101-109. A heavy line between a change request (CR) and a corresponding application represents that the change request directly impacts the corresponding application. For example, change requests CR1, CR2, CR3, CR4 and CR5 directly impact applications 101, 102, 107, 105 and 109 respectively. A solid line with an arrow between any two applications represents that a source application depends on a target application. For example, the application 101 depends on the application 106, and the application 103 depends on the application 101, etc.

Figure 19:
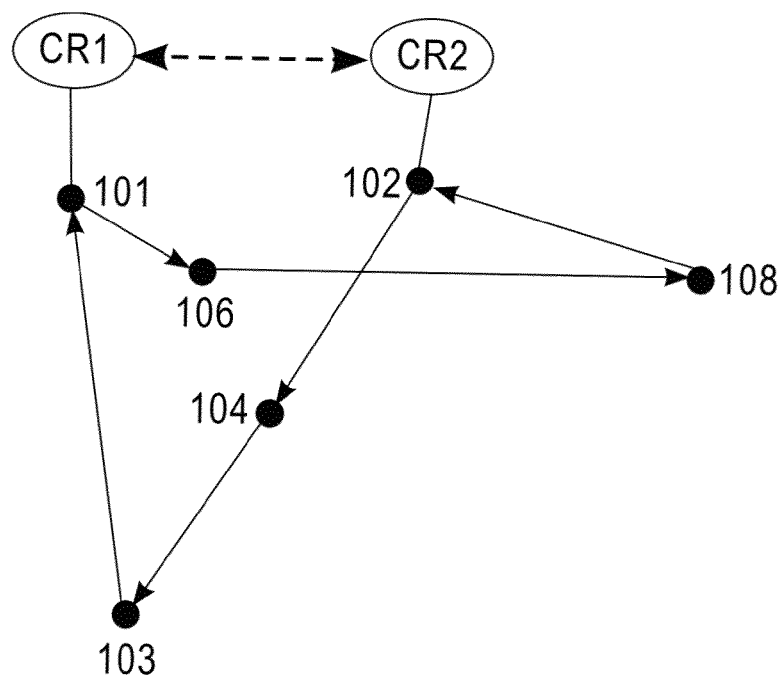
FIGS. 19-23 illustrate correlation points between two change requests.
Figure 20:
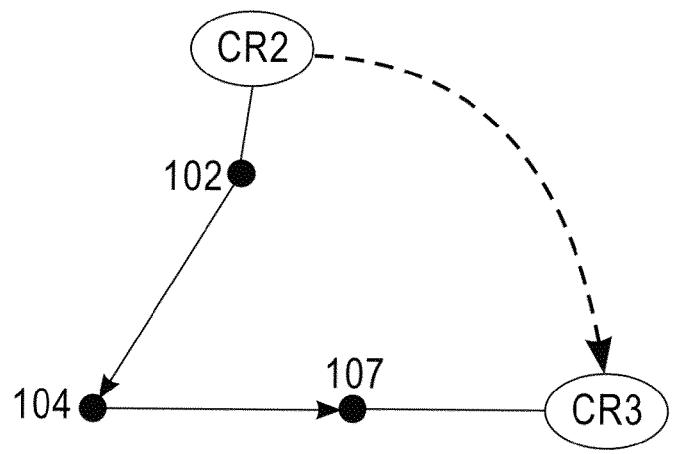
Figure 21:
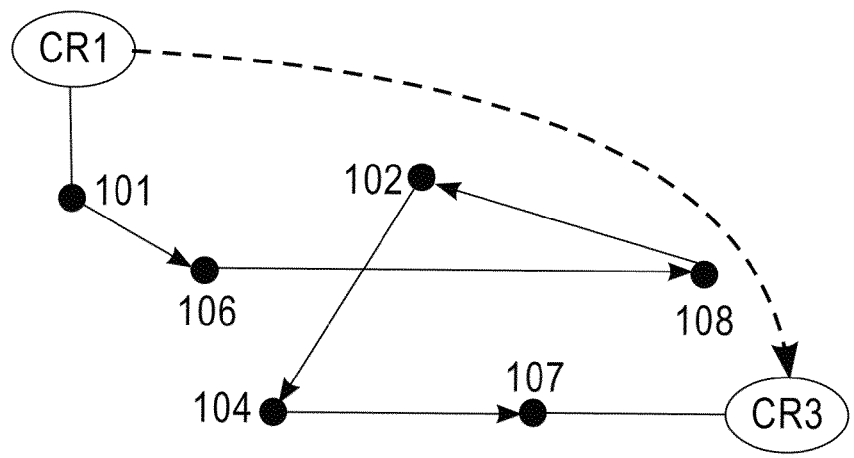
Figure 22:
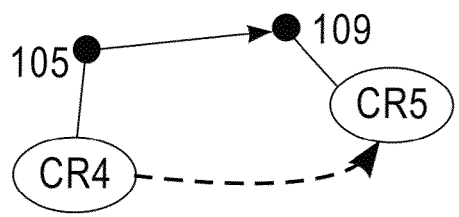
Figure 23:
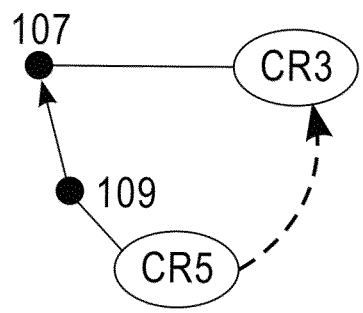
Figure 24:
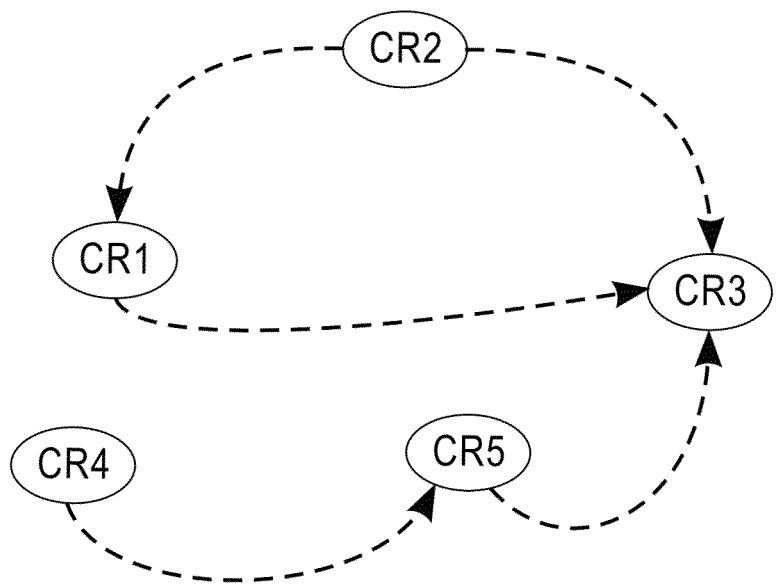
FIG. 24 illustrates a change request correlation network built according to an embodiment of the present invention.

Hereinafter, detailed description is provided to illustrate how to identify, based on the change request-application mapping diagram as shown in FIG. 18, correlations among the change requests CR1, CR2, CR3, CR4 and CR5 directly impacting the applications 101, 102, 107, 105 and 109 respectively. First of all, regarding each pair of CRs, there is identified a directional path between the pair based on the application dependency network. Then, there are removed paths that involve applications directly impacted by other CRs than the pair of CRs. Next, regarding each retained path between CRs in the pair of CRs, there are identified nodes on the path as correlated points between the pair of CRs. Further, FIGS. 13a-13e show correlated points between CR1 and CR2, between CR2 and CR3, between CR1 and CR3, between CR4 and CR5, and between CR3 and CR5 respectively. In addition, in FIGS. 13a-13e, dashed lines with arrows represent correlations between CRs. For example, in FIG. 13a, a dashed line with a two-way arrow represents that the estimate of a workload required for implementing the change indicated by CR1 depends on the estimate of a workload required for implementing the change indicated by CR2, and that the estimate of a workload required for implementing the change indicated by CR2 also depends on the estimate of a workload required for implementing the change indicated by CR1. For another example, in FIG. 19, a dashed line with a one-way arrow represents that the estimate of a workload required for implementing the change indicated by CR2 depends on the estimate of a workload required for implementing the change indicated by CR3.

Figure 14:
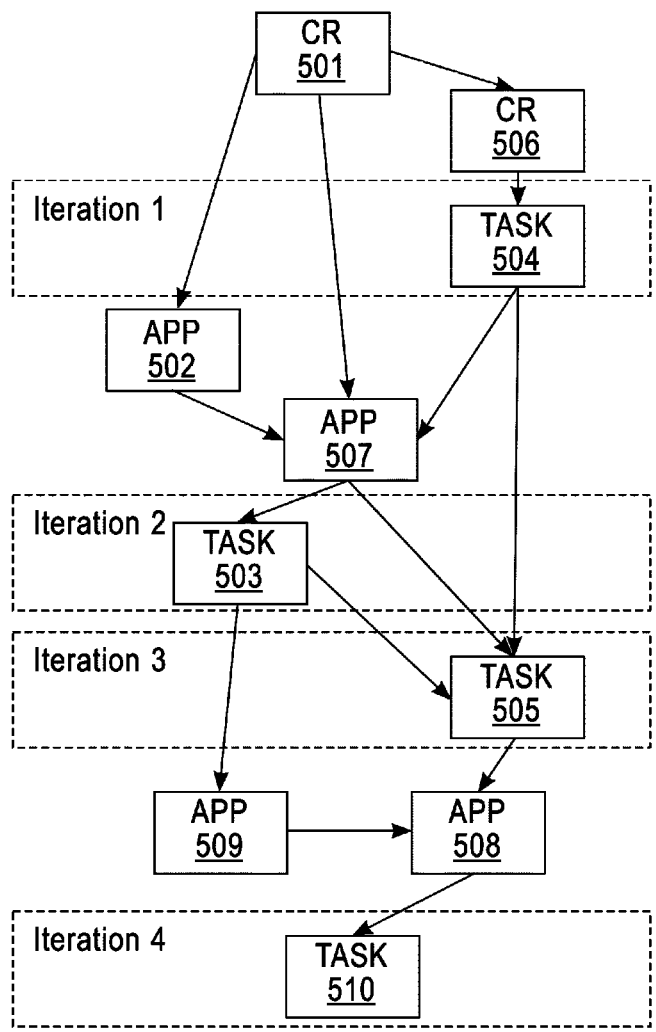
FIG. 14 illustrates a result of performing the process as shown in FIG. 13.

After identifying the correlation between the CRs in the pair of CRs as shown in FIGS. 13a-13e, a correlation network between CR1 and CR5 can be built, as shown in FIG. 14.

Afterwards, the correlation network as shown in FIG. 14 may be consolidated so as to generate collaboration topics. Specifically, first of all, there are identified loops in the correlation network, such as a loop formed by CR1 and CR2. Then, each of the identified loops is replaced with a super node. Next, a collaboration topic is built for each node and its direct sub-nodes. Last, a collaboration topic is built for each super node.

Afterwards, the built collaboration topics may be sequenced, and there may be defined attendees of collaboration, roles which attendees should play (e.g. initiator of the collaboration or ordinary attendee), and tasks of attendees (e.g. triggering discussions, sharing information, giving advice, etc.), and collaboration contexts, as shown in FIG. 15.

According to this embodiment of the present invention, correlations among a plurality of change requests directly impacting a plurality of applications are identified based on the change request repository and the application dependency network, and a workload required for implementing the change indicated by a change request is estimated based on the correlations among the plurality of change requests; and therefore, the accuracy of workload estimations for the plurality of correlated change requests is enhanced. The embodiments of the present invention further provide an apparatus for change request impact analysis.

Figure 26:
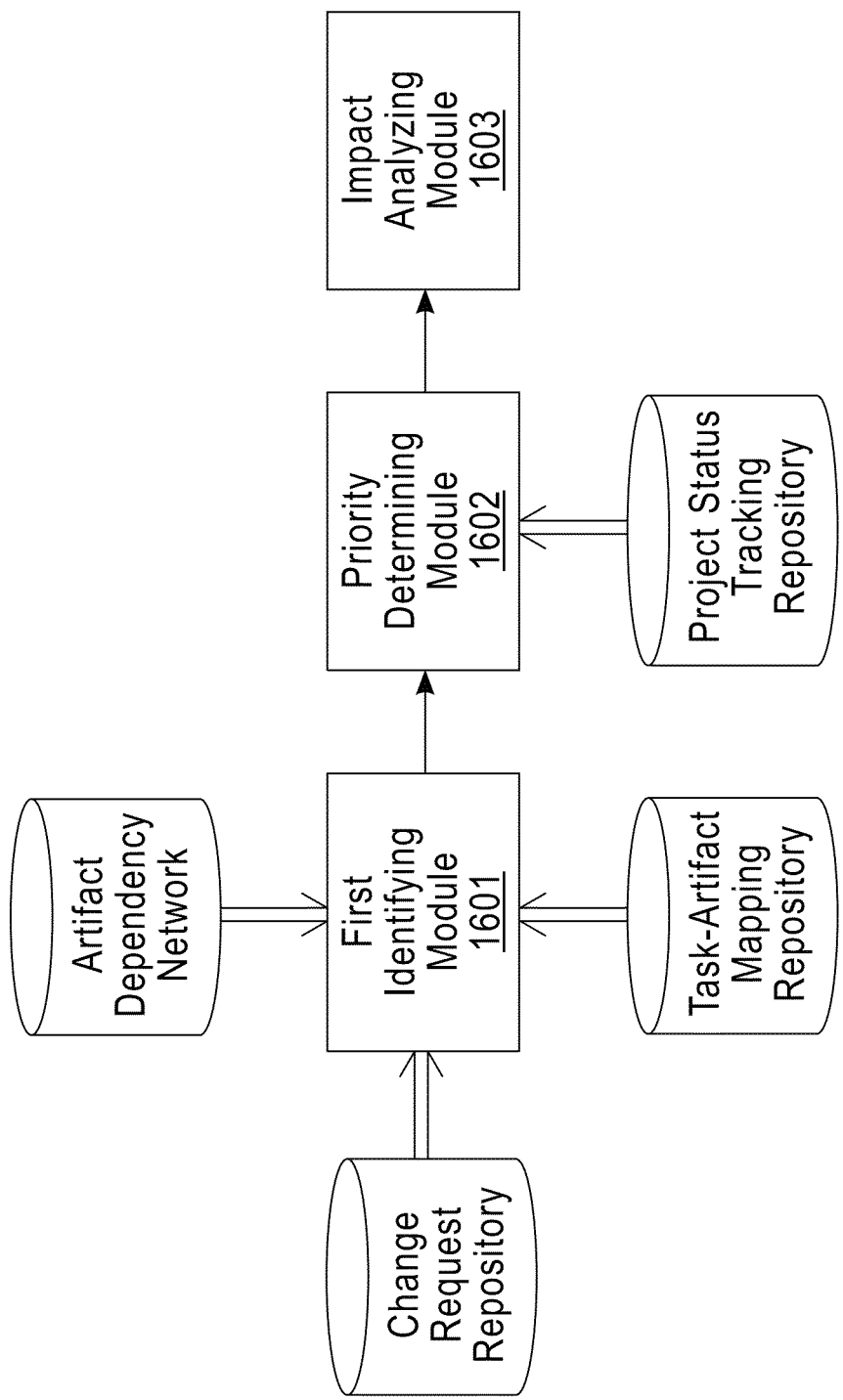
FIG. 26 illustrates a block diagram of an apparatus for impact analysis of change requests according to an embodiment of the present invention.

FIG. 26 schematically shows a block diagram of an apparatus for impact analysis of change requests according to an embodiment of the present invention. As shown in FIG. 16, the apparatus comprises: a first identifying module 1601 configured to identify artifacts and tasks that may be potentially impacted by a change request on a target project based on a change request repository, an artifact dependency network and a task-artifact mapping repository; a priority determining module 1602 configured to determine an impact analysis priority for each of the identified tasks based on associations among the change request and the identified artifacts and tasks, and a project status tracking repository; and an impact analyzing module 1603 configured to analyze an impact of the change request on each of the identified tasks according to the determined impact analysis priority.

In an exemplary embodiment, the impact analyzing module 1603 is further configured to analyze an impact of the change request on a task having a lower impact analysis priority based on the analyzing for one or more tasks having higher impact analysis priorities.

In an exemplary embodiment, the first identifying module 1601 at least comprises: a first identifying unit configured to identify, based on the change request repository, a first set of artifacts directly impacted by the change request on the target project; a second identifying unit configured to identify a first set of tasks associated with the first set of artifacts based on the task-artifact mapping repository; and a third identifying unit configured to identify a second set of artifacts associated with the first set of tasks based on the task-artifact mapping repository.

In an exemplary embodiment, the priority determining module 1602 is further configured to give a highest impact analysis priority to the first set of tasks.

In an exemplary embodiment, the apparatus further comprises: a second identifying module configured to identify, based on the change request repository and the artifact dependency network, correlations among a plurality of change requests directly impacting a plurality of artifacts respectively; and an estimating module configured to estimate a workload required for implementing a change indicated by each of the plurality of change requests based on the correlations among the plurality of change requests.

In an exemplary embodiment, the estimating module comprises: a priority determining unit configured to determine a workload estimation priority for each of the plurality of change requests based on the correlations among the plurality of change requests; and a workload estimating unit configured to estimate, for each of the plurality of change requests, a workload required for implementing a change indicated by each of the plurality of change requests according to the determined workload estimation priority.

In an exemplary embodiment, the workload estimating unit is further configured to estimate a workload required for implementing a change indicated by a change request having a lower workload estimation priority based on the estimating for one or more change requests having higher workload estimation priorities.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for impact analysis of change requests of a project scope, the method comprising:
    identifying, by one or more processors, artifacts and tasks that are impacted by a change request on a target project of a project scope, based on a change request repository, an artifact dependency network and a task-artifact mapping repository, wherein the change requests are requirement dependencies and requirement constraints of a plurality of applications for the project scope, wherein identifying the artifacts and the tasks that are impacted by the change request on the target project of the project scope comprises:
        obtaining, by the one or more processors, requirements, requirement dependencies and requirement constraints of the project scope for identifying the artifacts and tasks that are impacted by a change request on the target project of the project scope;
        generating, by the one or more processors, a first grouping scheme according to the requirement dependencies, wherein the requirements are divided into one or more groups such that requirements having a dependency are included into a same group;

receiving, by the one or more processors, user-defined relationship constraints;

generating, by the one or more processors, a set of candidate grouping schemes that satisfy the user-defined relationship constraints based on the first grouping scheme, wherein each candidate grouping scheme in the generated set comprises one or more groups; and calculating, by the one or more processors, a combined indicator for each candidate grouping scheme in the generated set according to the requirement constraints;

determining, by the one or more processors, an impact analysis priority for each of the identified tasks based on associations among the change request and the identified artifacts and tasks, and a project status tracking repository; and analyzing, by the one or more processors, an impact of the change request on each of the identified tasks according to the determined impact analysis priority.

2. The method according to claim 1, wherein analyzing an impact of the change request on each of the identified tasks according to the determined impact analysis priority further comprises:

analyzing an impact of the change request on a task having a lower impact analysis priority based on the analyzing for one or more tasks having higher impact analysis priorities.

3. The method according to claim 1, wherein the step of identifying artifacts and tasks that may be potentially impacted by a change request on a target project further comprises:

identifying, by the one or more processors, based on the change request repository, a first set of artifacts directly impacted by the change request on the target project;

identifying, by the one or more processors, a first set of tasks associated with the first set of artifacts based on the task-artifact mapping repository; and identifying, by the one or more processors, a second set of artifacts associated with the first set of tasks based on the task-artifact mapping repository.

4. The method according to claim 1, wherein the step of determining, by the one or more processors, an impact analysis priority for each of the identified tasks comprises providing an impact analysis priority to the first set of tasks.

5. The method according to claim 1, further comprising:

identifying, by the one or more processors, based on the change request repository and the artifact dependency network, correlations among a plurality of change requests directly impacting a plurality of artifacts respectively; and estimating, by the one or more processors, a workload required for implementing a change indicated by each of the plurality of change requests based on the correlations among the plurality of change requests.

6. The method according to claim 5, wherein the estimating, by the one or more processors, a workload required for implementing each of changes indicated by the plurality of change requests based on the correlations among the plurality of change requests further comprises:

determining, by the one or more processors, a workload estimation priority for each of the plurality of change requests based on the correlations among the plurality of change requests; and for each of the plurality of change requests, by the one or more processors, a workload required for implementing a change indicated by each of the plurality of change requests according to the determined workload estimation priority.

7. The method according to claim 1, wherein the step of identifying artifacts and tasks that are impacted by a change request on a target project of a project scope, based on a change request repository, an artifact dependency network and a task-artifact mapping repository, further comprises:

displaying the each candidate grouping scheme in the generated set and its corresponding combined indicator.

8. A computer system for impact analysis of change requests, the computer system comprising:

one or more processors, one or more computer-readable memories, one or more computer-readable tangible storage devices and program instructions which are stored on at least one of the one or more storage devices for execution by at least one of the one or more processors via at least one of the one or more memories, the program instructions comprising:

program instructions to identify artifacts and tasks that are impacted by a change request on a target project of a project scope, based on a change request repository, an artifact dependency network and a task-artifact mapping repository, wherein the change requests are requirement dependencies and requirement constraints of a plurality of applications for the project scope, wherein program instructions to identify the artifacts and the tasks that are impacted by the change request on the target project of the project scope comprises:

program instructions to obtain requirements, requirement dependencies and requirement constraints of the project scope for identifying the artifacts and tasks that are impacted by a change request on the target project of the project scope;

program instructions to generate a first grouping scheme according to the requirement dependencies, wherein the requirements are divided into one or more groups such that requirements having a dependency are included into a same group;

program instructions to user-defined relationship constraints;

program instructions to generate a set of candidate grouping schemes that satisfy the user-defined relationship constraints based on the first grouping scheme, wherein each candidate grouping scheme in the generated set comprises one or more groups; and program instructions to calculate a combined indicator for each candidate grouping scheme in the generated set according to the requirement constraints;

program instructions to determine an impact analysis priority for each of the identified tasks based on associations among the change request and the identified artifacts and tasks, and a project status tracking repository; and program instructions to analyze an impact of the change request on each of the identified tasks according to the determined impact analysis priority.

9. The computer system according to claim 8, wherein analyzing an impact of the change request on each of the identified tasks according to the determined impact analysis priority further comprises: analyzing an impact of the change request on a task having a lower impact analysis priority based on the analyzing for one or more tasks having higher impact analysis priorities.

10. The computer system according to claim 8, wherein the step of identifying artifacts and tasks that may be potentially impacted by a change request on a target project further comprises:
   program instructions to identify, based on the change request repository, a first set of artifacts directly impacted by the change request on the target project;
   program instructions to identify a first set of tasks associated with the first set of artifacts based on the task-artifact mapping repository; and
   program instructions to identify a second set of artifacts associated with the first set of tasks based on the task-artifact mapping repository.

11. The computer system according to claim 8, wherein the step of determining an impact analysis priority for each of the identified tasks comprises providing an impact analysis priority to the first set of tasks.

12. The computer system according to claim 8, further comprising:
   program instructions to identify, based on the change request repository and the artifact dependency network, correlations among a plurality of change requests directly impacting a plurality of artifacts respectively; and
   program instructions to estimate a workload required for implementing a change indicated by each of the plurality of change requests based on the correlations among the plurality of change requests.

13. The computer system according to claim 12, wherein estimating a workload required for implementing each of changes indicated by the plurality of change requests based on the correlations among the plurality of change requests further comprises:
   program instructions to determining a workload estimation priority for each of the plurality of change requests based on the correlations among the plurality of change requests; and
   program instructions to estimate a workload required for implementing a change indicated by each of the plurality of change requests according to the determined workload estimation priority for each of the plurality of change requests.

14. The computer system according to claim 13, wherein for each of the plurality of change requests, estimating a workload required for implementing a change indicated by each of the plurality of change requests according to the determined workload estimation priority further comprises: estimating a workload required for implementing a change indicated by a change request having a lower workload estimation priority based on the estimating for one or more change requests having higher workload estimation priorities.

15. A computer program product for impact analysis of change requests, the computer system comprising:
   one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
   program instructions to identify artifacts and tasks that are impacted by a change request on a target project of a project scope, based on a change request repository, an artifact dependency network and a task-artifact mapping repository, wherein the change requests are requirement dependencies and requirement constraints of a plurality of applications for the project scope, wherein program instructions to identify the artifacts and the tasks that are impacted by the change request on the target project of the project scope comprises:
      program instructions to obtain requirements, requirement dependencies and requirement constraints of the project scope for identifying the artifacts and tasks that are impacted by a change request on the target project of the project scope;
      program instructions to generate a first grouping scheme according to the requirement dependencies, wherein the requirements are divided into one or more groups such that requirements having a dependency are included into a same group;
      program instructions to user-defined relationship constraints;
      program instructions to generate a set of candidate grouping schemes that satisfy the user-defined relationship constraints based on the first grouping scheme, wherein each candidate grouping scheme in the generated set comprises one or more groups; and
      program instructions to calculate a combined indicator for each candidate grouping scheme in the generated set according to the requirement constraints;
   program instructions to determine an impact analysis priority for each of the identified tasks based on associations among the change request and the identified artifacts and tasks, and a project status tracking repository; and
   program instructions to analyze an impact of the change request on each of the identified tasks according to the determined impact analysis priority.

16. The computer program product according to claim 15, wherein analyzing an impact of the change request on each of the identified tasks according to the determined impact analysis priority further comprises: analyzing an impact of the change request on a task having a lower impact analysis priority based on the analyzing for one or more tasks having higher impact analysis priorities.

17. The computer program product according to claim 15, wherein the step of identifying artifacts and tasks that may be potentially impacted by a change request on a target project further comprises:
   program instructions to identify, based on the change request repository, a first set of artifacts directly impacted by the change request on the target project;
   program instructions to identify a first set of tasks associated with the first set of artifacts based on the task-artifact mapping repository; and
   program instructions to identify a second set of artifacts associated with the first set of tasks based on the task-artifact mapping repository.

18. The computer program product according to claim 15, wherein the step of determining an impact analysis priority for each of the identified tasks comprises providing an impact analysis priority to the first set of tasks.

19. The computer program product according to claim 15, further comprising:
   program instructions to identify, based on the change request repository and the artifact dependency network, correlations among a plurality of change requests directly impacting a plurality of artifacts respectively; and
   program instructions to estimate a workload required for implementing a change indicated by each of the plurality of change requests based on the correlations among the plurality of change requests.

20. The computer program product according to claim 19, wherein estimating a workload required for implementing each of changes indicated by the plurality of change requests based on the correlations among the plurality of change requests further comprises:
 program instructions to determining a workload estimation priority for each of the plurality of change requests based on the correlations among the plurality of change requests; and
 program instructions to estimate a workload required for implementing a change indicated by each of the plurality of change requests according to the determined workload estimation priority for each of the plurality of change requests.

\* \* \* \* \*